United States Patent
Uenuma et al.

(10) Patent No.: US 8,775,018 B2
(45) Date of Patent: Jul. 8, 2014

(54) DRIVER'S FEELING CONTROL APPARATUS

(75) Inventors: Kenya Uenuma, Yokohama (JP);
Keijiro Iwao, Yokohama (JP); Yuichiro Sakurai, Yokohama (JP); Tatsuo Sakai, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1180 days.

(21) Appl. No.: 11/642,951

(22) Filed: Dec. 21, 2006

(65) Prior Publication Data

US 2008/0154460 A1    Jun. 26, 2008

(51) Int. Cl.
*G06F 7/00*    (2006.01)

(52) U.S. Cl.
USPC ............ 701/36; 297/284.9; 297/344.23

(58) Field of Classification Search
USPC ............ 701/36, 41; 180/326, 333; 297/284.9, 297/344.23
See application file for complete search history.

(56) References Cited

U.S. PATENT DOCUMENTS

| | | | | |
|---|---|---|---|---|
| 5,207,451 A | * | 5/1993 | Furuse et al. | 280/775 |
| 5,321,617 A | * | 6/1994 | Mori et al. | 701/49 |
| 5,676,601 A | * | 10/1997 | Saunders | 472/29 |
| 7,188,014 B1 | * | 3/2007 | Liao et al. | 701/49 |
| 2003/0127272 A1 | * | 7/2003 | Baker et al. | 180/326 |

FOREIGN PATENT DOCUMENTS

| | | |
|---|---|---|
| JP | 61-285147 A | 12/1986 |
| JP | 63-4733 U | 1/1988 |
| JP | 63-151549 A | 6/1988 |
| JP | 1-167928 U | 11/1989 |
| JP | 3-34130 U | 4/1991 |
| JP | 5-229373 A | 9/1993 |
| JP | 6-284942 A | 10/1994 |
| JP | 7-315088 A | 12/1995 |
| JP | 9-244264 A | 9/1997 |

OTHER PUBLICATIONS

"Technique for Improving Maneuverability of Vehicle", Society of Automotive Engineers of Japan, Inc., Mar. 10, 1998, 5 pgs.

* cited by examiner

*Primary Examiner* — John Q Nguyen
*Assistant Examiner* — Rodney P King
(74) *Attorney, Agent, or Firm* — Foley & Lardner LLP

(57) ABSTRACT

A driver's feeling control apparatus which includes: a steering detection unit which detects the amount of steering operation by a driver; a seat in which the driver sits, and which has a movable part displaceable in a perpendicular direction with respect to the longitudinal direction of a vehicle, or in a yaw direction; and a control unit which determines the amount of the displacement of the movable part in response to the amount of steering operation.

2 Claims, 19 Drawing Sheets

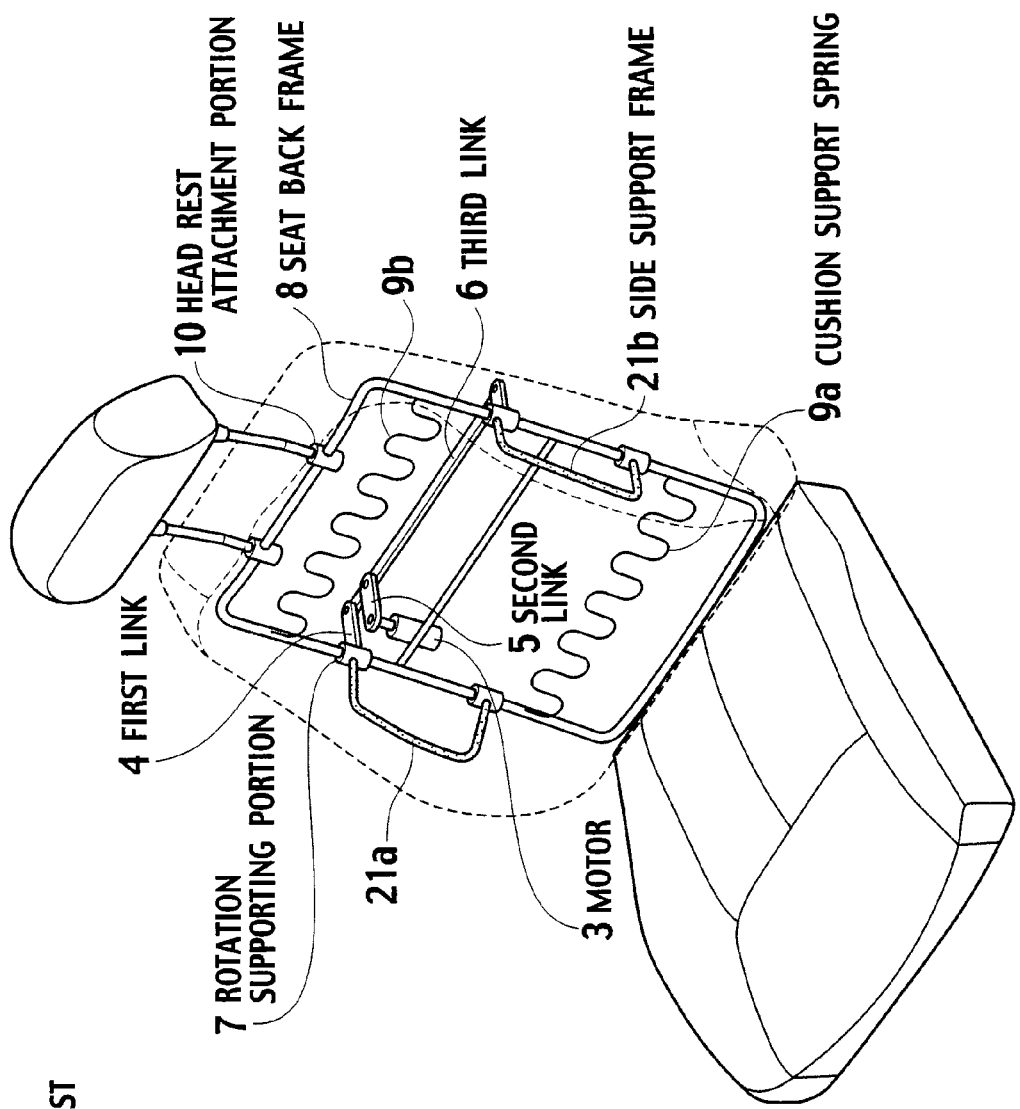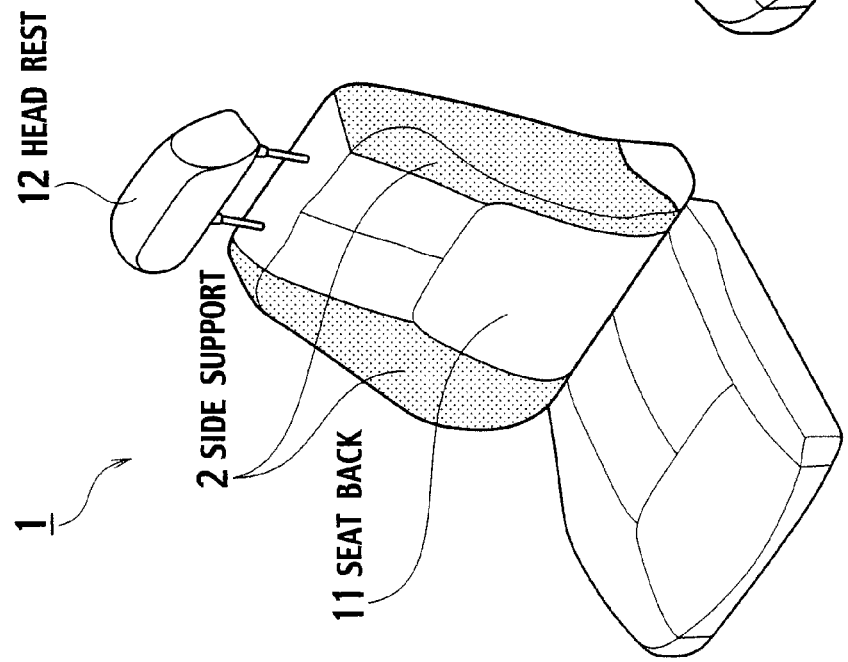

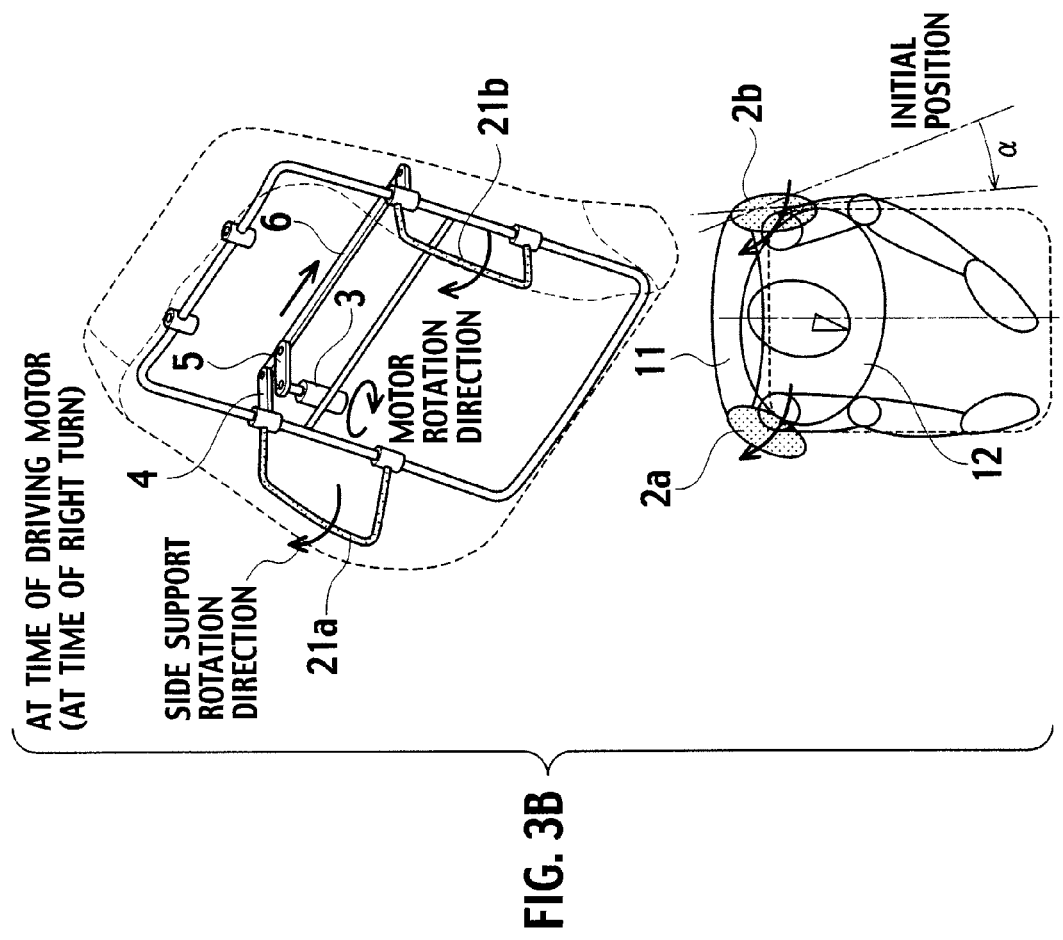
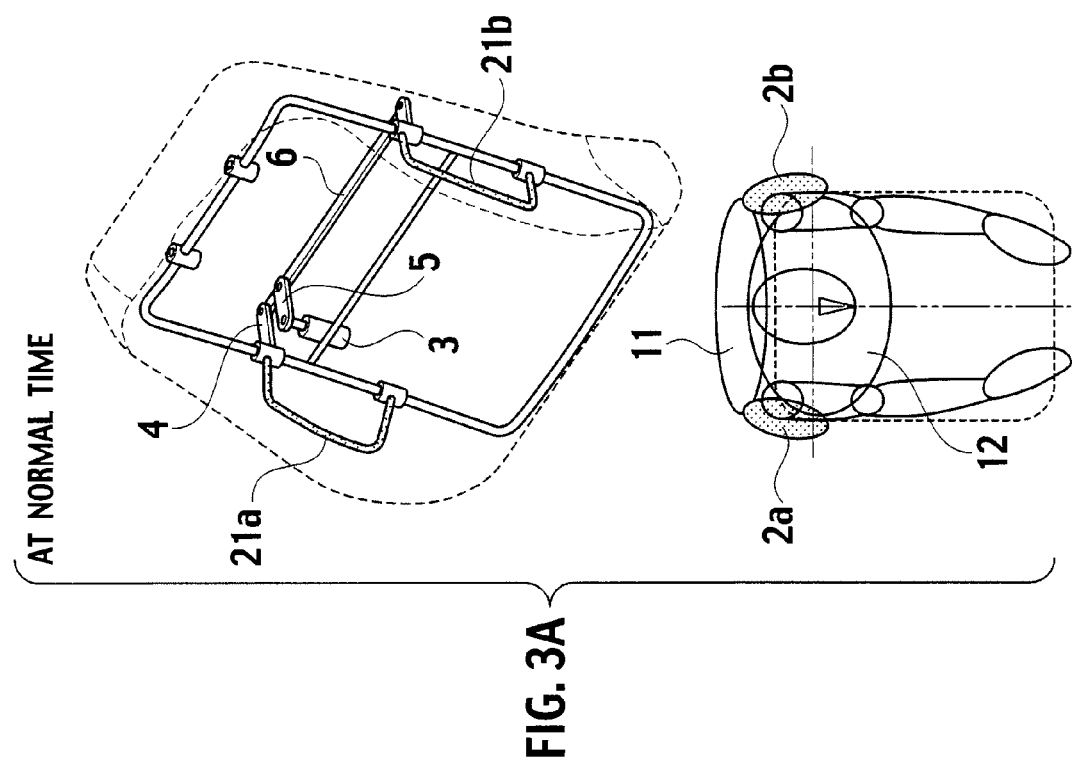

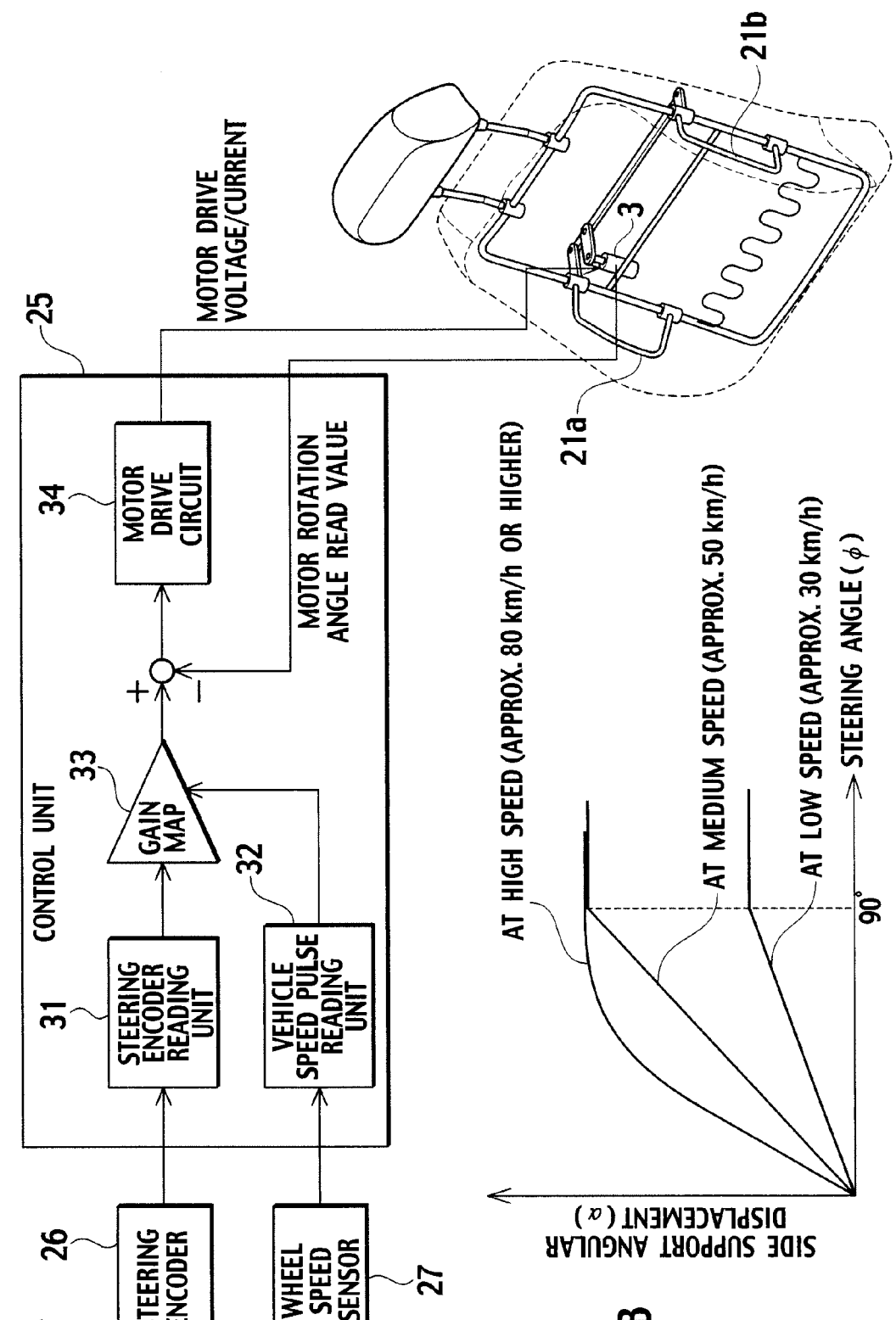

WHEN DRIVING STRAIGHT

AT TIME OF TURN

ROTATIONAL DISPLACEMENT OF SIDE SUPPORT

TRANSLATIONAL DISPLACEMENT OF SIDE SUPPORT

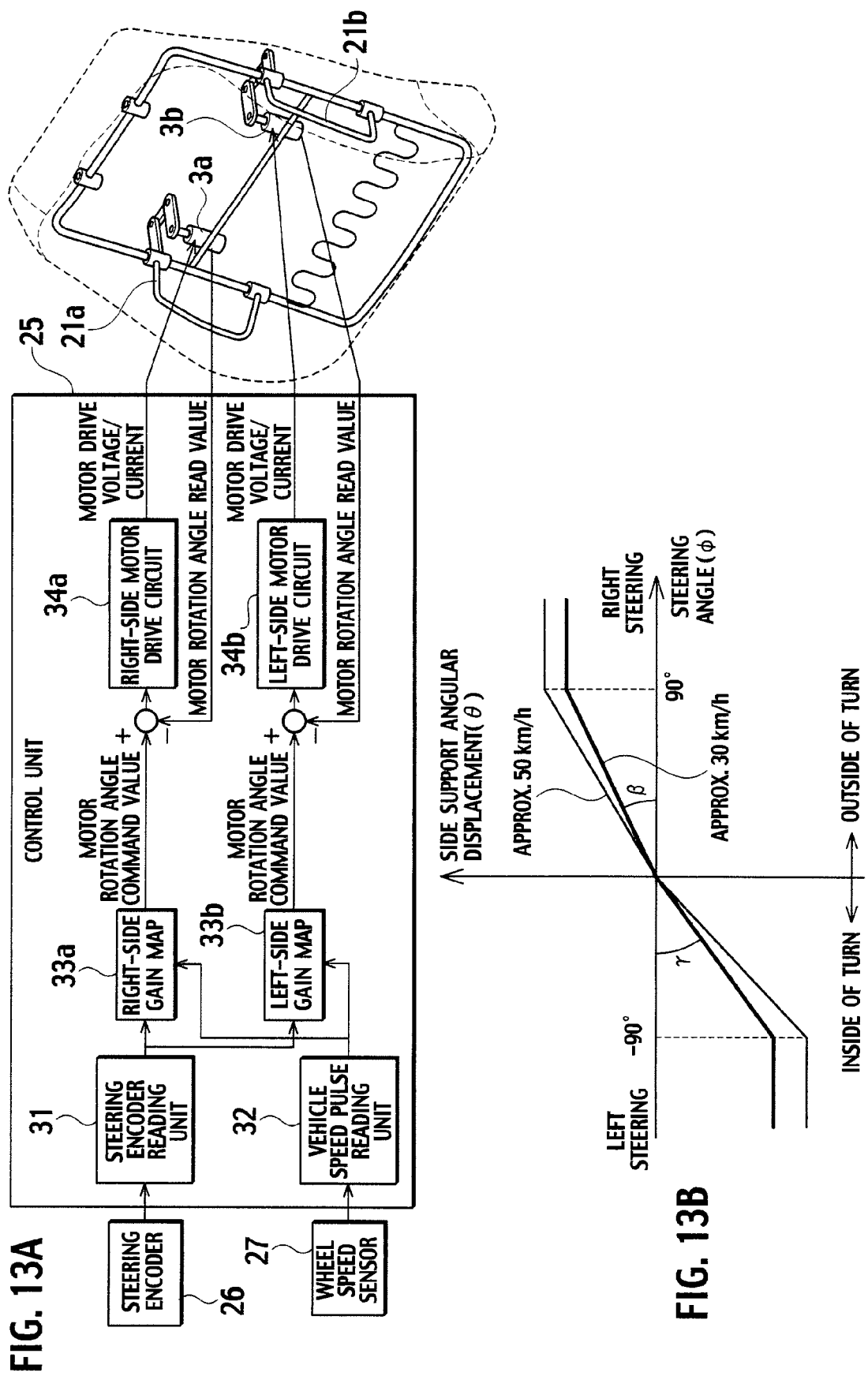

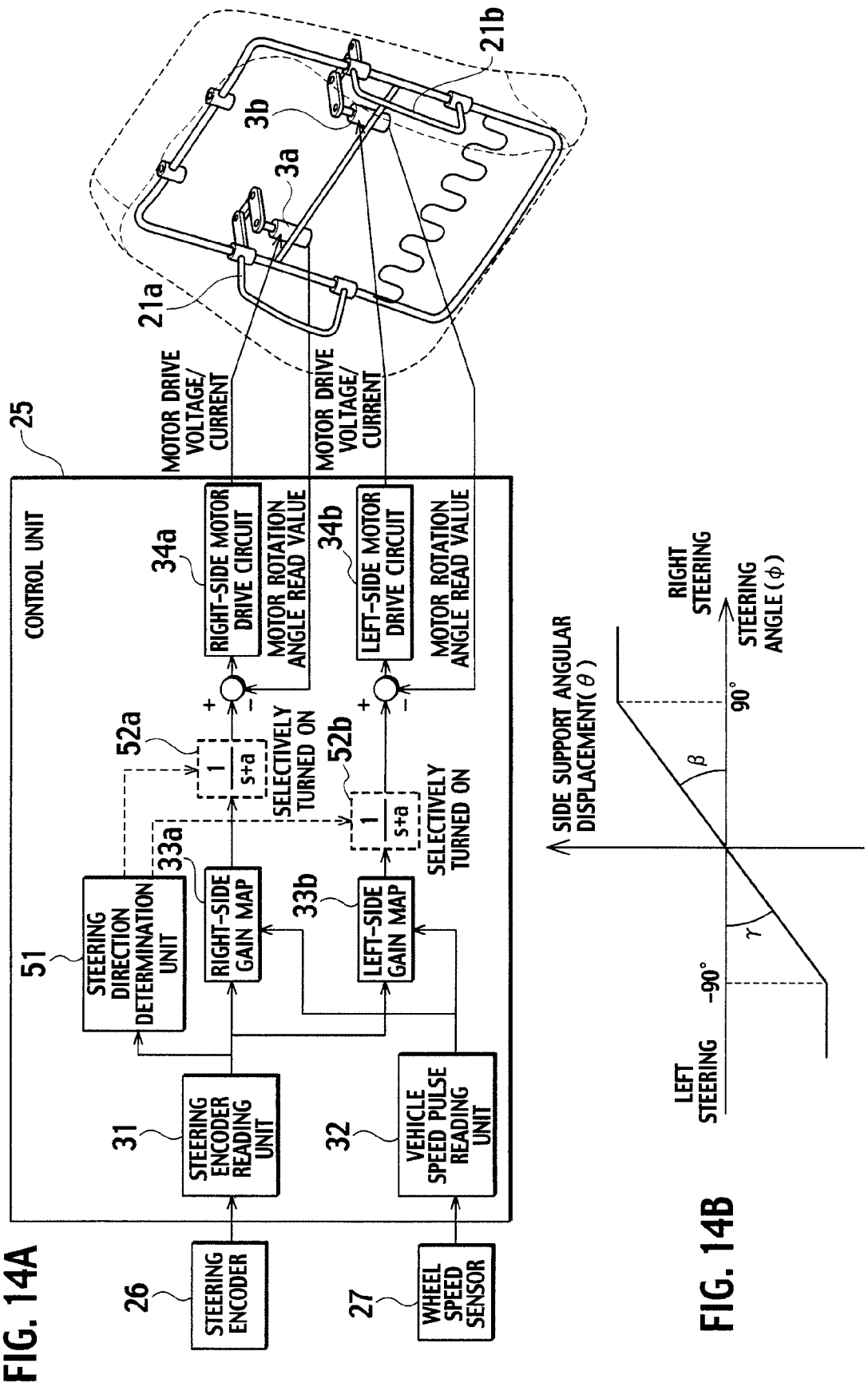

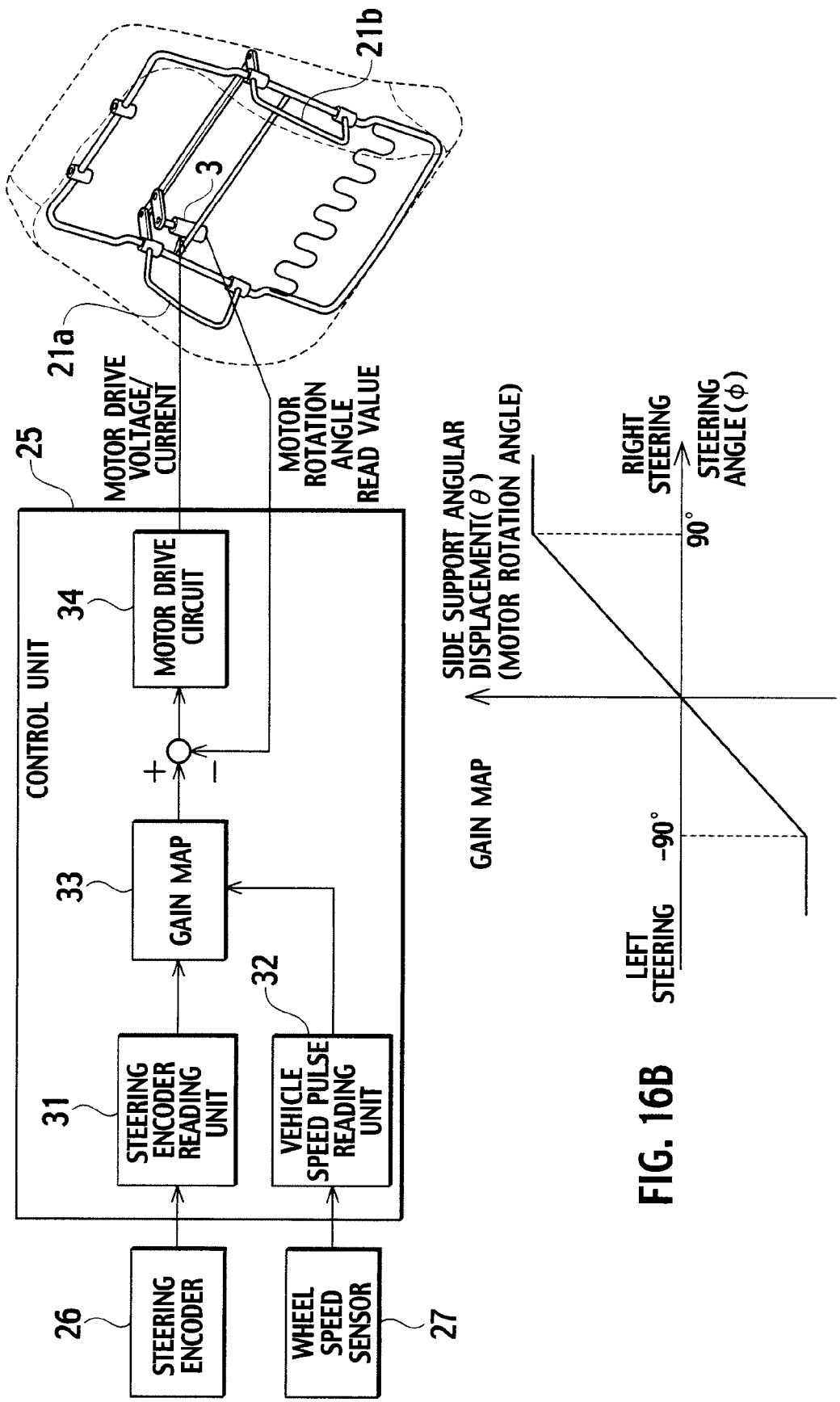

DRIVER'S FEELING CONTROL APPARATUS

BACKGROUND OF THE INVENTION

1. Field of Invention

The present invention relates to a driver's feeling control apparatus which drives a seat in response to a state of a vehicle.

2. Description of Related Art

Taking the yaw rate and the acceleration to a lateral direction (hereinafter, referred to as "lateral G") generated by the rotation and revolution movements of a vehicle as representative characteristics, the responses (phase or time constant) of the yaw rate and the lateral G to a steering operation for a turn may be set as indexes for evaluating the maneuverability when turning a vehicle.

A vehicle is considered to be driven with ease when the yaw rate and the lateral G thereof occur in the same phase with respect to steering. Influence over the driving feeling of the human exerted by a phase relation between the yaw rate and the lateral G at the time of turning a vehicle is described in "Technique for Improving Maneuverability of Vehicle" (edited by Society of Automotive Engineers of Japan, Inc.).

A suspension has been conventionally tuned in a manner that the time constants of yaw rate and lateral G for steering are in close agreement, and that the time constants fall within a range of approximately 0.05 s to 0.10 s.

However, in a case of a general vehicle of which front wheels are the only wheels to be steered, a turning motion has one degree of freedom for a steering input with two degrees of freedom for outputs of yaw and lateral motions. For this reason, each of the time constants of the yaw rate and the lateral G cannot be controlled independently. As a result, it is difficult to keep the time constants of the yaw rate and of the lateral G within the above-mentioned ideal range in an actual vehicle which is to be designed to meet the requirements of ride comfort and the like.

On the other hand, there is a conceivable technique to control yaw and lateral motions independently of each other in accordance with the turning operation of the steering wheel, by performing four wheel steering to steer the rear wheels in addition to the front wheels so that the time constant of the lateral G substantially agrees with that of the yaw rate.

In addition to this technique, Japanese Patent Application Laid-open No. Sho 63-151549 discloses a technique for supporting a body against the lateral G by driving the movable part provided to a part of a seat. Additionally, Japanese Patent Application Laid-open No. Hei 7-315088 shows a technique in which a movable part of a seat can be rotated in a yaw direction. When the driver turns his/her upper body around, for example, to move a vehicle backward, the movable part is rotated to follow the driver's upper body.

SUMMARY OF THE INVENTION

Four wheel steering is a means to achieve improvement in a phase relationship between lateral G and yaw rate, and other objects such as improvement in stability of a vehicle. However, the four wheel steering is a technique which is relatively high in costs, and for this reason, has been applied to a relatively high-class vehicle only. It has been difficult for a two wheel steering vehicle to have the time constants of the lateral G and the yaw rate being in close agreement with each other at low costs.

The present invention has been made in the light of the above-mentioned problems, and an object of the present invention is to provide a driver's feeling control apparatus which causes the time constants of lateral G and yaw rate to substantially agree with each other at low costs compared with the four wheel steering.

An aspect of the present invention is a driver's feeling control apparatus which includes: a steering detection unit which detects the amount of steering operation by a driver; a seat in which the driver sits, and which has a movable part displaceable in a perpendicular direction with respect to the longitudinal direction of a vehicle, or in a yaw direction; and a control unit which determines the amount of the displacement of a movable part in response to the amount of a steering operation.

BRIEF DESCRIPTION OF THE DRAWINGS

FIGS. 2A and 2B are perspective views each showing a specific configuration of the seat of FIG. 1, FIG. 2A shows its external appearance, and FIG. 2B shows its internal structure.

FIGS. 3A and 3B are each perspective and top views, showing a relationship between the displacement of the side support of FIG. 2B and a steering operation performed by a driver, FIG. 3A shows a state during a normal time, and FIG. 3B shows a state during a right turn.

FIG. 4A is a view specifically showing an entire configuration of the driver's feeling control apparatus of FIG. 1, and FIG. 4B is a graph showing an example of a gain map.

FIG. 6A shows a case of saturating the angular displacement of the side support in a range where the steering wheel is turned by 90° or more, FIG. 6B shows a case where the angular displacement of the side support in the range where the steering wheel is turned by 90° or more is extrapolated and complemented, and FIG. 6C shows a case where it becomes α>θ transiently in a range where the steering wheel is turned by 90° or less.

FIG. 12A shows a state during a normal time, and FIG. 12B shows a state during a right turn.

FIG. 13A is a view showing in detail an entire configuration of a driver's feeling control apparatus according to a second embodiment, and FIG. 13B is a graph showing an example of a gain map.

FIG. 14A is a view showing in detail an entire configuration of a driver's feeling control apparatus according to a modification example of FIG. 13A, and FIG. 14B is a graph showing an example of a gain map therefor.

FIG. 16A is a block diagram showing a configuration of a control unit for a seat of FIG. 15A, and FIG. 16B shows a gain map provided to the control unit.

DETAILED DESCRIPTION OF THE PREFERRED EMBODY

Hereinafter, descriptions will be given of embodiments of the present invention with reference to the drawings. In the descriptions of the drawings, the same or similar symbols are applied to the same or similar parts.

First Embodiment

Figure 1:
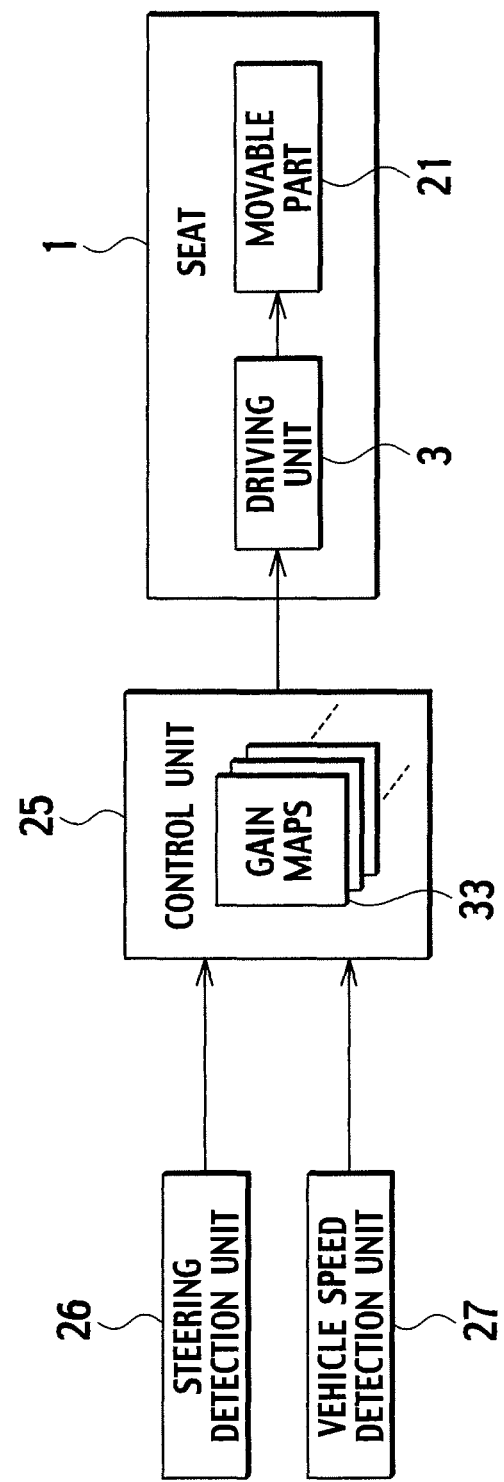
FIG. 1 is a block diagram showing an entire configuration of a driver's feeling control apparatus according to a first embodiment of the present invention.

As shown in FIG. 1, a driver's feeling control apparatus according to a first embodiment of the present invention includes a steering detection unit 26, a seat 1, a control unit 25, a driving unit 3, and a vehicle speed detection unit 27. The steering detection unit 26 detects the amount of steering operation performed by a driver. The seat 1 is where the driver sits, and has a movable part 21 displaceable in a perpendicular direction to the longitudinal direction of a vehicle, or in a yaw direction. The control unit 25 determines the displacement amount of the movable part 21 based on the amount of a steering operation detected by the steering detection unit 26. The driving unit 3 drives the movable part 21. The vehicle speed detection unit 27 detects the speed of a vehicle.

The movable part 21 is displaced in the same direction as the directions respectively of yaw rate and centripetal acceleration which occur in the vehicle.

The control unit 25 includes gain maps 33 which determines the displacement amount of the movable part 21 with respect to the amount of a steering operation detected by the steering detection unit 26. The control unit 25 controls the displacement amount of the movable part 21 in accordance with the corresponding one of the gain maps 33. Specifically, the control unit 25 transmits a command to the driving unit 3 for the purpose of driving the movable part 21. Incidentally, it is desirable that the gain maps 33 are a plurality of gain maps of which relationships between the amount of displacement and that of a steering operation differs in response to speed detected by the vehicle speed detection unit 27.

The control unit 25 switches the gain maps 33 in response to speed detected by the vehicle speed detection unit 27.

FIGS. 2A and 2B show a specific configuration of the seat 1 of FIG. 1. FIGS. 2A and 2B show the external appearance of the seat 1 and the internal structure of the seat 1, respectively.

As shown in FIG. 2A, the seat 1 includes a seat back 11 (a seat back), a pair of right and left side supports 2, and a headrest. The seat back 11 is to be in contact with a driver's back when the driver sits. The pair of side supports 2 are placed respectively on both sides of the seat back 11. The headrest is placed on an upper side of the seat back 11. The side supports 2 respectively lean toward driver's sides in a way that the side supports 2 fit the respective sides of the driver.

As shown in FIG. 2B, the seat 1 includes a seat back frame 8, a pair of right and left side support frames 21a and 21b, and a motor 3. The seat back frame 8 forms a skeletal structure of the seat 1. The pair of side support frames 21a and 21b support the respective side supports 2. The motor 3 drives the side support frames 21a and 21b simultaneously.

Incidentally, the movable part 21 of FIG. 1 corresponds to the pair of right and left side supports 2 of FIG. 2A and to the side support frames 21a and 21b of FIG. 2B. The driving unit 3 of FIG. 1 corresponds to the motor 3.

The side support frames 21a and 21b are supported by the seat back frame 8 via a pair of top and bottom rotation supporting portions 7 respectively, and are displaced in a perpendicular direction to the longitudinal direction of a vehicle, or a yaw direction. Here, shown is a case where the pair of right and left side support frames 21a and 21b are rotatably supported. The side support frames 21a and 21b are covered with cushions to form the side supports 2 in FIG. 2A.

The rotational shaft of the motor 3 is coupled with the side support frames 21a and 21b via first to third links 4 to 6 and the rotation supporting portion 7. The first to third links 4 to 6 form a substantially-parallel link structure. The side support frames 21a and 21b are displaced in a perpendicular direction to the longitudinal direction of a vehicle, or a yaw direction, by causing the motor 3 to rotate. In other words, the rotational action of the motor 3 is conveyed as the oscillatory motion of the side support frames 21a and 21b. With this motion, the side supports 2 in FIG. 2A are displaced in the similar direction to that of the side support frames 21a and 21b. The motor 3 is fixed to the seat back frame 8.

Incidentally, the headrest in FIG. 2A is connected to the seat back frame 8 with a headrest attachment portion 10. The seat back frame 8 has a square form, and cushion support springs 9a and 9b are arranged inside the seat back frame 8 with a predetermined interval.

As shown in FIG. 3A, when a vehicle is not making a turn, that is, when a driver is not conducting a steering operation of the steering wheel (at a normal time), the right and left side support frames 21a and 21b (side supports 2a and 2b) are respectively held in bilaterally symmetrical positions with respect to an axis of the longitudinal direction of the vehicle. The motor 3 is not performing a rotational action, and thus the first to third links 4 to 6 do not move.

On the other hand, as shown in FIG. 3B, when a vehicle is making a right turn, that is, when a driver is conducting a steering operation of the steering wheel for a right turn (at the time when turning right), the motor 3 is caused to rotate by a certain angle in a direction shown in FIG. 3B. This rotation of the motor 3 is conveyed to the right and left side support frames 21a and 21b via the first to third links 4 to 6. Then, the side support frames 21a and 21b (the side supports 2a and 2b) rotate by an angle α of rotation in the same direction as a yaw direction of the vehicle at the time when turning right, the rotation starting from a position of FIG. 3A (an initial position). Note that, in the first embodiment, the angles α of rotation of the respective right and left side support frames 21a and 21b are equal to each other.

Incidentally, Japanese Patent Application Laid-open No. Sho 63-151549 discloses a technique of supporting a body against lateral G by operating side supports, when the vehicle turns. However, the right and left side supports are caused to perform a yaw rotation respectively in directions in which a driver's upper body is tightened, that is, in directions opposite to each other. For this reason, the above technique is obviously different from the first embodiment of the present invention in which the right and left side support frames 21a and 21b (side supports 2a and 2b) are driven in the same direction concurrently with a turn.

FIG. 4A is a view which specifically shows the entire configuration of the driver's feeling control apparatus of FIG. 1, and which particularly shows the configuration of the control unit 25 in detail. The control unit 25 (a control unit) includes: a steering encoder reading unit 31 which reads the amount of steering operation detected by a steering encoder 26 (a steering detection unit); a speed pulse reading unit 32 to read the speed of a vehicle detected by a wheel speed sensor 27 (a vehicle speed detection unit); the gain maps 33; and a motor drive circuit 34 which transmits a drive command value to cause the motor 3 to rotate. The steering encoder 26 is provided to the steering wheel. Signals are input to the control unit 25 from an encoder or a potentiometer which reads out a rotation angle of the motor 3 provided to the seat 1.

Signals from the steering encoder 26 are counted, and converted to a read steering angle φ. Thereafter, the steering angle φ is multiplied by a gain to find a rotation angle command value. Moreover, the rotation angle command value is input to the motor drive circuit 34, and drive voltage/current is then applied to the motor 3. The front part of the motor drive circuit 34 receives feedback on the current value of a motor rotation angle to control a position of the side support frames 21a and 21b.

As shown in FIG. 4B, the control unit 25 includes the gain maps 33 which are mutually different, depending on speed, for example, at the time when vehicle speed is low (approximately at 30 km/h), medium (approximately at 50 km/h), or high (approximately at 80 km/h). The control unit 25 determines a rotation angle command value of the motor 3 with respect to a steering angle by use of the corresponding gain map 33.

Here, shown is the gain map 33 with side support angular displacement α with respect to the steering angle φ. However, in reality, it is desirable that the control unit 25 have a map in which a gain of the side support angular displacement α with respect to the rotation angular displacement of the motor 3 is multiplied, the dimensions of the first to third links 4 to 6 being taken into consideration for the side support angular displacement α.

At a low speed of approximately 50 km/h or lower as a reference, the gain map 33 basically has a linear characteristic, and a gain increases as vehicle speed increases from a state of 0 km/h. The angular displacement a of the side supports 2a and 2b are caused to be saturated when the steering angle φ reaches 90°.

At medium or high speed of 50 km/h or higher, the gain map 33 has a non-linear characteristic that the angular displacement α of the side supports 2a and 2b are caused to be saturated gradually as the steering angle φ increases by largely moving the side supports 2a and 2b in a range where the steering wheel starts to be turned. As in the case of low speed, the angular displacement a of the side supports 2a and 2b corresponding to the steering angle φ is caused to increase as vehicle speed increases. Incidentally, although omitted in FIG. 4B, an upper limit value is set in order not to increase a gain further, even when vehicle speed increases, in a vehicle speed range of approximately 80 km/h or higher, which is used, for example, when driving on a highway. This point will be described later.

In this manner, in a case where a steering operation amount φ is fixed, the control unit 25 switches the gain maps 33 in order to increase the displacement amount α of the side supports 2a and 2b in response to an increase in vehicle speed. The gain map 33 has a linear characteristic when vehicle speed is lower than a predetermined speed threshold value (for example, 50 km/h), and has a non-linear characteristic when vehicle speed is at the speed threshold value (50 km/h) or higher.

Figure 5A:
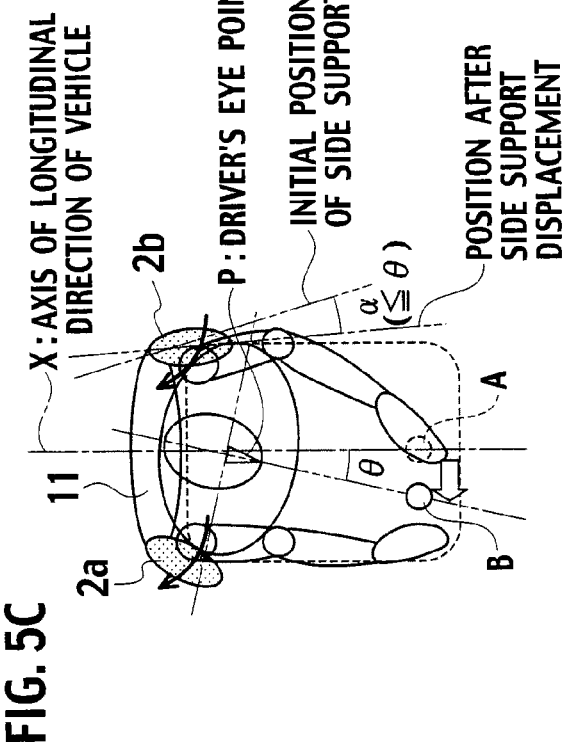
FIG. 5A is a view of a driver's upper body as viewed from above, at the time when a vehicle is moving straight forward.
Figure 5B:
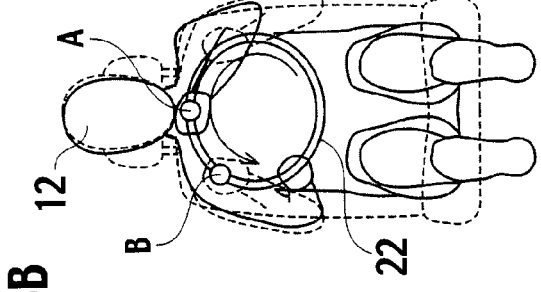
FIG. 5B shows a state where a certain point on the steering wheel moves from a point A where the vehicle moves straight forward, to a point B.
Figure 5C:
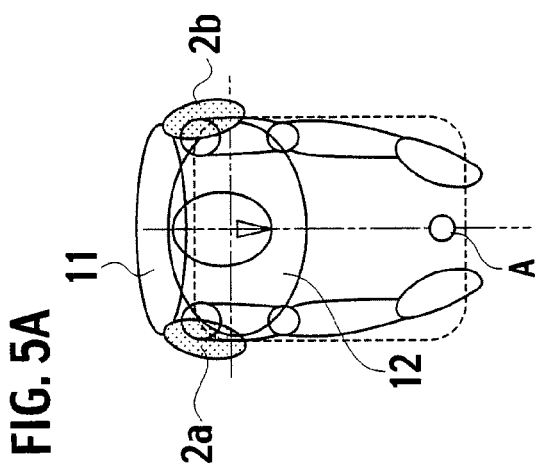
FIG. 5C is a view of a down shot of a driver's upper-body in a state of FIG. 5B.

FIG. 5A is a view of an upper body of a driver 12 as viewed from above, at the time when a vehicle is moving straight forward, and a point A shows a point to be the topmost point of the steering wheel when the vehicle moves straight forward. As shown in FIG. 5B, until a certain point on the steering wheel moves from the point A where the vehicle moves straight forward to a point B, the driver 12 conducts a steering operation in a direction of a right turn. In this event, as shown in FIG. 5C, an angle of a straight line, which connects the eye point P of the driver 12 to the point B, to an axis in the longitudinal direction of the vehicle X is set to be θ. At this time, the displacement amount α of the right and left side supports 2a and 2b satisfies a relationship of $0<\alpha \leq \theta$. In other words, a yaw rotation angle α as the displacement amount of the side supports 2a and 2b is set to be $0<\alpha \leq \theta$ where θ is an angle that a line along the longitudinal direction of the vehicle X forms with a straight line connecting the point A to the eye point P of the driver 12. The point A is at the point of the steering wheel when the vehicle moves straight forward. However, this setup is limited to a case where a steering angle φ as the amount of a steering operation is within ±90°.

The reason thereof is that the posture of a driver's upper body is changed at an angle substantially within this range when the driver 12 turns his/her upper body at the time of a turn. Furthermore, setting a gain in this range makes it possible to make a comfortable turn since the side supports 2a and 2b move along a motion of the driver 12 turning his/her upper body.

Figure 5D:
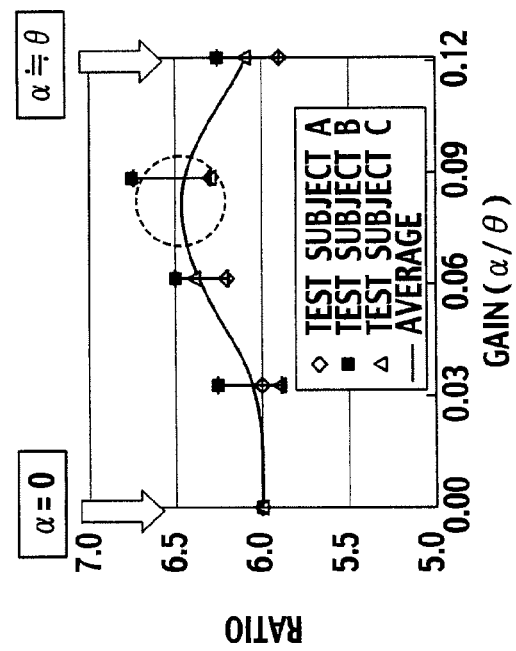
FIG. 5D is a graph showing the result of a verification test.

FIG. 5D shows the result of a test for verifying the above effect. The lateral axes show the numeric values of the angular displacement α of the side supports 2a and 2b with respect to a steering angle (the steering wheel turning angle Φ)). These numeric values themselves are merely shown as reference values since they change depending on a gear ratio of the steering. Incidentally, a gain being 0 shows a case where the side supports are not driven at all. Focusing on a driving feeling, especially on the maneuverability of a vehicle immediately after a steering operation starts, the subjective evaluations at the time when a gain is changed are plotted on the longitudinal axes by setting a feeling in a state of a gain 0 as a reference represented as 6.0 points.

A gain 0 corresponds to $\alpha=0$, and a point of a gain 0.12 corresponds to $\alpha \approx \theta$. It was confirmed, as a result of evaluations made by test subjects A to C, that the evaluation values are at the maximum within the range of $0<\alpha<\theta$, in a part circled with a dotted line in FIG. 5D.

In an actual vehicle, the diameter of the steering wheel and a steering gear ratio vary among vehicle types. However, the value of an angle θ that an axis in the longitudinal direction of a vehicle forms with a straight line connecting the eye point P of the driver 12 to the point B, can be determined on the supposition, for convenience, that the steering wheel has a diameter often used (=approximately 330 to 380 mm), and that a gear ratio is approximately 13 to 20. The upper limit values of gains similarly vary among the positions of the eye point P of the driver 12 relative to the steering wheel, that is, the amount of sliding back and forth of the seat 1. However, it is not necessarily required to adjust the angles of oscillation of the side supports 2a and 2b by detecting the slide amount of the seat 1 in order to strictly keep this positional relationship. It suffices that the magnitude of an angle θ be determined on the supposition that the driver 12 has an average physique.

The reason why the movements of the side supports 2a and 2b need not be controlled so that the movements correspond to the steering wheel, a steering gear ratio and an eye point position is as follows. Specifically, strict position control is not significant since soft cushions are generally provided to the surfaces of the side supports 2a and 2b.

In this manner, when the steering angle φ as the amount of a steering operation is within ±90°, a yaw rotation angle α as the displacement amount of the side supports 2a and 2b is set to be 0<α≤θ where θ is an angle that an axis in the longitudinal direction of the vehicle X forms with a straight line connecting the point A to the eye point P of the driver 12. The point A is the topmost point of the steering wheel when the vehicle moves straight forward.

Figure 6A:
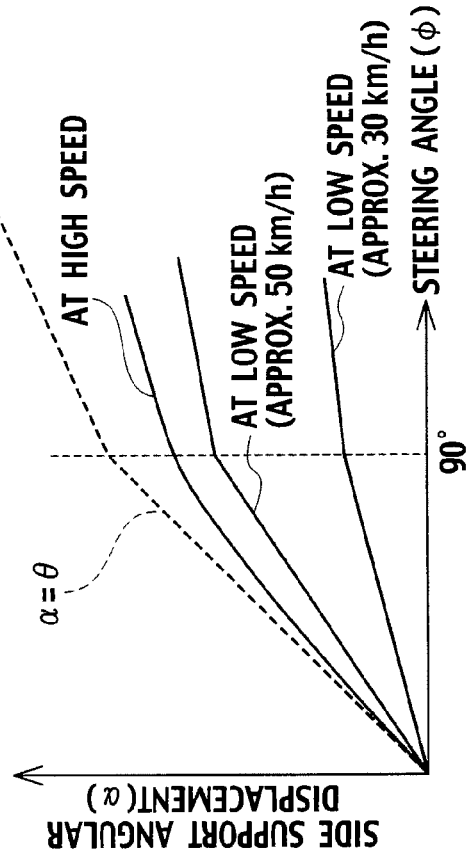
FIGS. 6A to 6C are graphs showing other examples of gain maps.
Figure 6B:
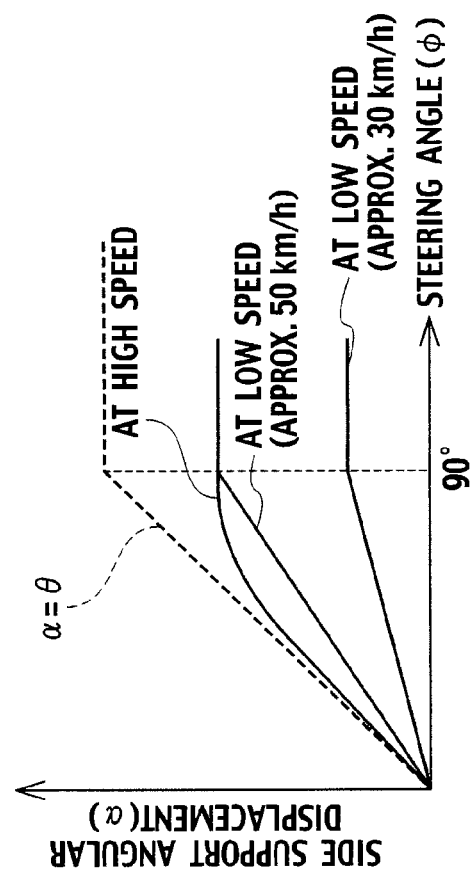
Figure 6C:
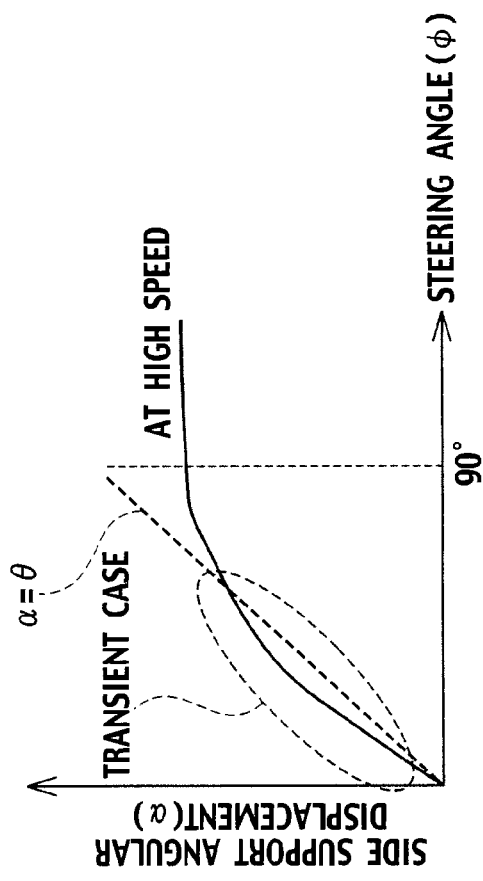

FIGS. 6A, 6B and 6C are graphs which show other examples of a gain map, and show a concept of a gain maximum value. As shown in FIG. 4B, FIG. 6A shows an example in which the angular displacement of the side support is saturated in a range where the steering wheel turns by 90° or more. Any one of the gains of angular displacement α is lower than a dotted line where α=θ. When the steering wheel is turned by 90° or more, θ decreases in consideration of the above concept. However, the upper limit value of a gain is caused to be saturated in the range where the steering wheel turns by 90° or more.

FIG. 6B shows a case where the angular displacement α of the side supports 2a and 2b are extrapolated and complemented in the range where the steering wheel turns by 90° or more. Note that the upper limit value of a gain may be extrapolated and complemented in a manner that the value is continuous with a curve showing α=θ in the range where the steering wheel turns by 90° or less.

As shown in FIG. 6C, since the side supports 2a and 2b are covered with soft cushions, it is acceptable, in transient steering, for the value α to slightly exceed the upper limit value (α=θ) of a gain shown in FIG. 6C. The reason is that, in a case where the side supports 2a and 2b are driven dynamically, displacement on the surfaces of cushions are not necessarily caused in accordance with a command value, due to the presence of the cushions. In other words, when performing transient steering, the value α for the displacement of the inside of the seat 1 may momentarily exceed the upper limit value of a gain shown in FIG. 6C. It suffices that ultimate values be sensed as α≤θ, for example, with senses of pressure, touch, or force perceived by the driver 12.

As described above, when the steering angle φ exceeds ±90°, a yaw rotation angle α is set to be saturated, or to be 0<α≤θ with respect to a change characteristic of a virtual angle θ extrapolated in a manner that the virtual angle θ is continuous with the angle θ for the steering angle φ within ±90°.

Modification Example

In the preceding descriptions of the first embodiment, shown has been the example in which the side support frames 21a and 21b perform rotational displacement in a yaw direction of the seat back frame B. However, the present invention is not limited to the above configuration. For example, as shown in FIGS. 7A, 7B and 7C, the side support frames 21a and 21b may be displaced in parallel, and in a perpendicular direction to the longitudinal direction of a vehicle with respect to the seat back frame B.

Figure 7A:
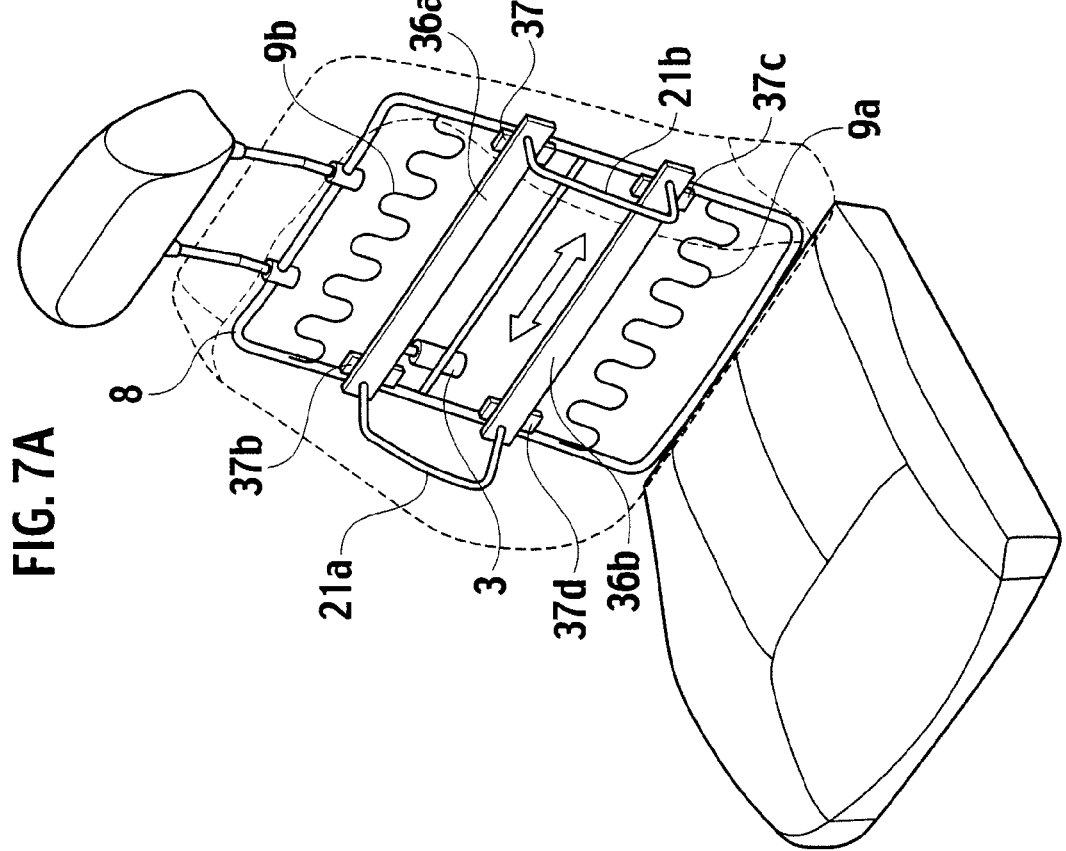
FIG. 7A is a perspective view showing a specific internal structure of a seat according to a modification example.

FIG. 7A shows a specific internal structure of a seat 1 according to a modification example. Descriptions will be given of points different from those of the internal structure of FIG. 2B, and descriptions will be omitted for the identical parts. Both sides of right and left side support frames 21a and 21b are connected to slide rails 36a and 36b, respectively. Accordingly, the relative positions of the right and left side support frames 21a and 21b are fixed. The slide rails 36a and 36b also serve as the slide rail parts of linear guides, and parts corresponding to sliders 37a to 37d of the linear guides are fixed to the seat back frame B. With this configuration, the right and left side support frames 21a and 21b are integrally supported in a manner that the side support frames can be displaced in a lateral direction of the seat back frame 8. Furthermore, racks are placed on the back sides of the slide rails 36a and 36b. Pinion gears engaging with these racks are driven by a motor 3 fixed to the seat back frame 8. Thereby, the side support frames 21a and 21b can move in a lateral direction.

Figure 7B:
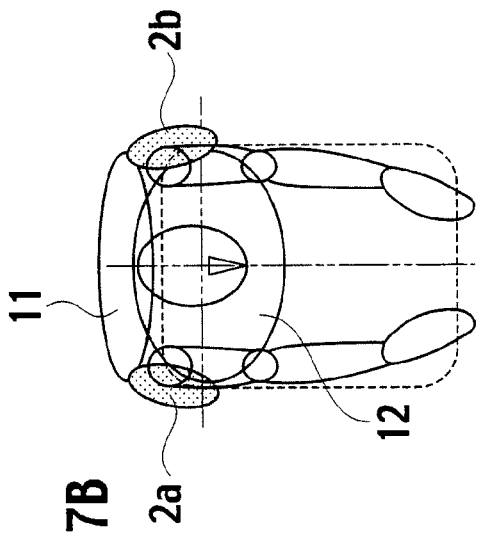
FIGS. 7B and 7C are top views showing a relationship between the displacement of a side support and a steering operation.
Figure 7C:
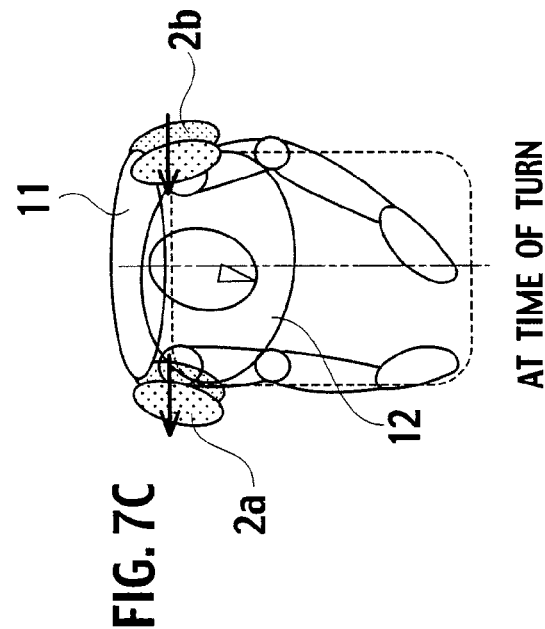

As shown in FIG. 7B, the side support frames 21a and 21b are located to be bilaterally symmetrical to a driver 12 and to a seat back 11 when a vehicle moves straight forward. Moreover, as shown in FIG. 7C, the side support frames 21a and 21b move parallel in a lateral direction to the longitudinal direction of the vehicle at the time of a turn, here, at the time of turning right. With the above method, it is also possible to provide the driver 12 with a yaw rate feeling similar to the rotational displacement of the side supports 2a and 2b.

Figure 8A:
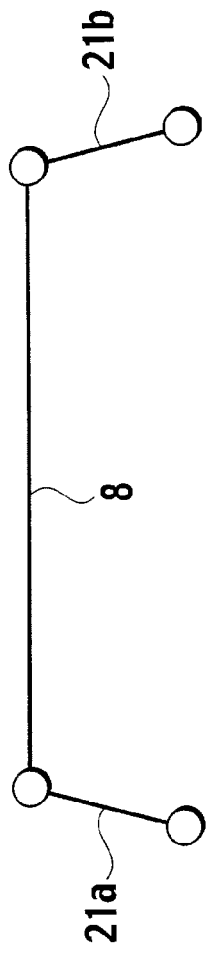
FIG. 8A is a view schematically showing only a seat back frame and a side support frame.
Figure 8C:
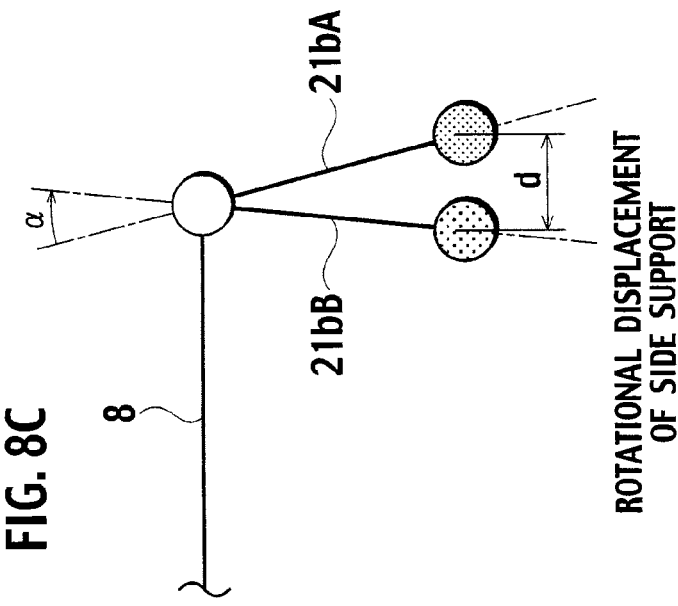
FIG. 8C shows a case of the rotation displacement of the side support frame.
Figure 8B:
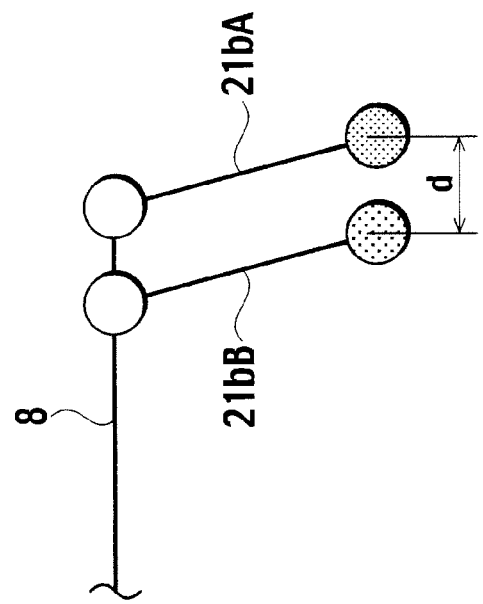
FIG. 8B shows a case of the translational displacement of the side support frame.

In a case where a mechanism of FIG. 7A is adopted, the upper limit value of a gain can be considered as follows, for example. FIG. 8A schematically shows only the seat back frame 8 and the side support frame 21b. FIG. 8B shows a state where the side support frame 21b moves, from this state, parallel in the lateral direction. At this time, the lateral-direction displacement amount (distance) of an end of the side support frame 21b is set to be "d". When considering the upper limit value of a gain, the following case is supposed. Specifically, the lateral-direction displacement amount d of the end of the side support frame 21b is obtained due to rotational displacement as in FIG. 8C. In other words, it suffices that the lateral-direction displacement amount d be set in a manner that a virtual rotation angle α of the side support frame 21b satisfies a relationship of 0<α≤θ described above.

In this event, the displacement distance of the end of the side support frame 21b is considered to be a representative value. Alternatively, the center of the contact load of the upper body of the driver 12 to the side supports 2a and 2b may be considered to be a representative point, and the lateral-direction displacement can be considered to be that of the above representative point. Since the seat cushions have elasticity, the seat cushions give the driver 12 a certain degree of sense of robustness. Thus, there is not much difference in effect exerted by the first embodiment of the present invention among cases in which the respective above-mentioned concepts are used.

A seat structure described as follows is disclosed in Japanese Patent Application Laid-open No. Hei 7-315088. That is, a seat back is divided into two, which are upper and lower parts, namely an upper seat back and a lower seat back, and each rotatably support an occupant. Thereby, when the occupant turns around while being seated, the seat back rotates backward around a longitudinal shaft (namely substantially in a yaw direction) along with the occupant's motion. By using such a seat structure, and by rotating a seat back in synchronization with steering by use of any one of electrical means such as a motor and mechanical means which pulls the seat back with a wire connected to the steering wheel, it is possible to achieve an embodiment to which the present invention is applied. Also in this case, the concept of the rotation angle gain of the seat back and the upper limit value of the rotation angle gain, for the amount of a steering operation performed by a driver, can be set as described above.

Additionally, in an industrial machine such as a forklift, it is possible to apply the present invention to a structure in which an entire seat rotates relative to a vehicle body for the purpose of checking backward with ease when the vehicle moves backward. Specifically, it suffices that the gain of rotation displacement be set as described above by causing the rotation amount of the entire seat to be in synchronization with the steering operation by the driver by use of the aforementioned electrical means or mechanical means.

Figure 19:
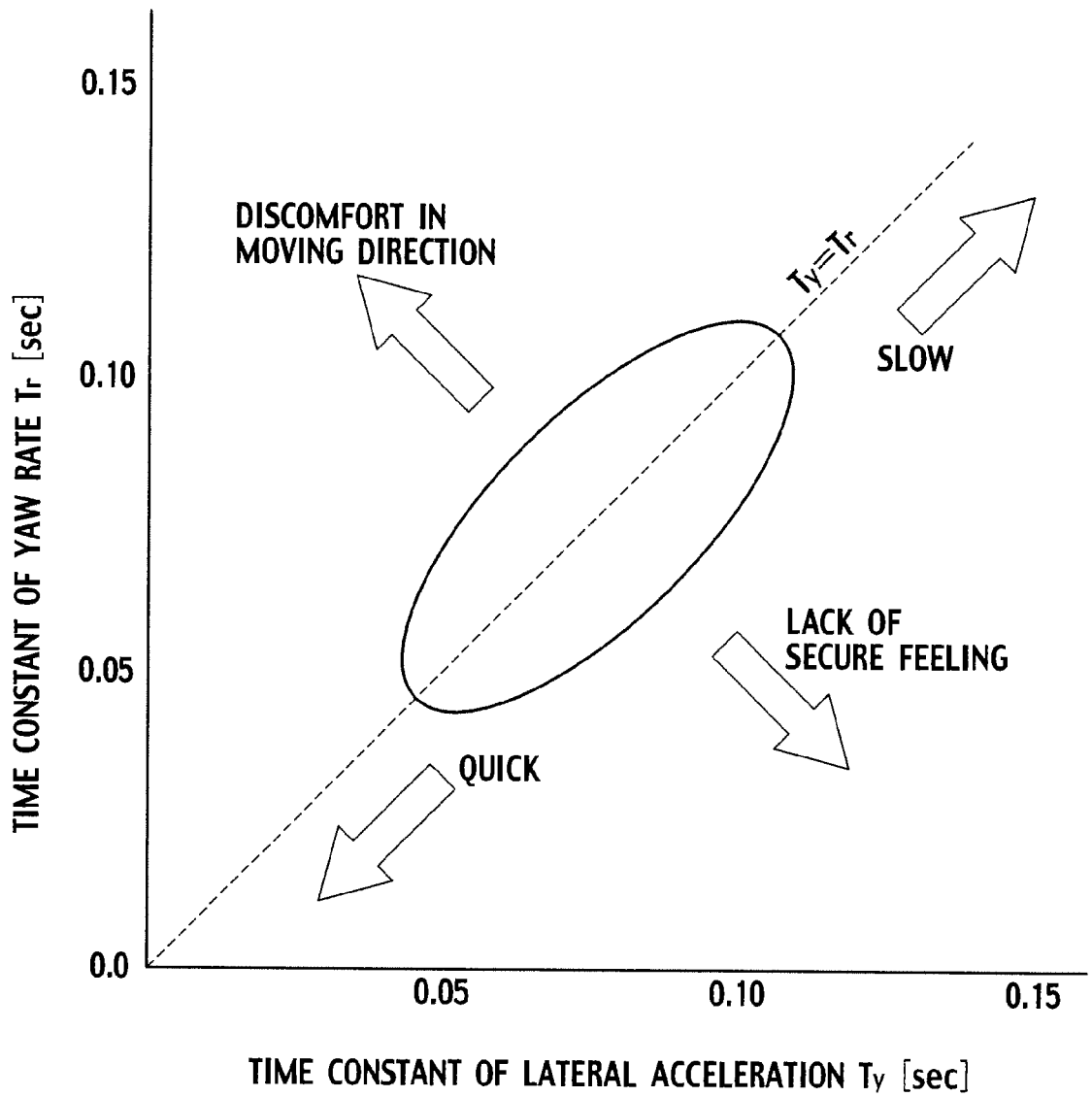
FIG. 19 is a graph showing a relationship between a time constant of a degree of lateral acceleration (lateral G) and a time constant of yaw rate.

Incidentally, FIG. 19 is extracted from p. 69 of "Technique for Improving Maneuverability of Vehicle" (edited by Society of Automotive Engineers of Japan, Inc.). The lateral axis shows a time constant of lateral G and the longitudinal axis shows a time constant of yaw rate. In this document, a time constant of yaw rate is nearly equal to a time constant of lateral G. In addition, a range where a time constant is approximately 0.05 s to 0.10 s is a range of good maneuverability. A suspension has been conventionally tuned in a manner that a relationship between the time constants of yaw rate and of lateral G for steering falls in a range similar to the above-mentioned relationship.

Test Example

Figure 9B:
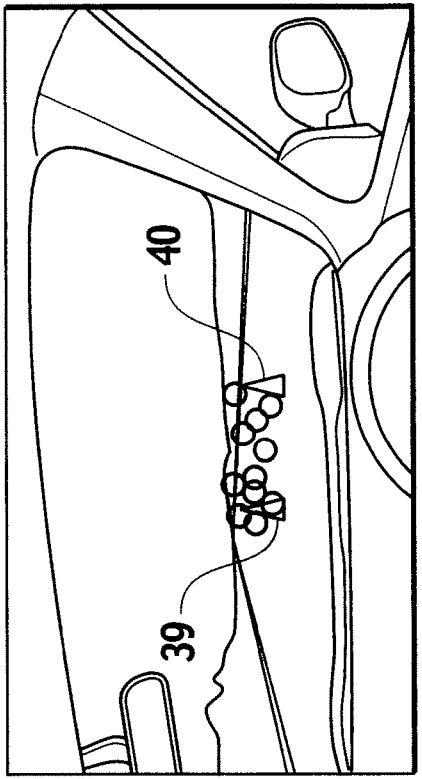
FIGS. 9B and 9C show results of observing behaviors of a driver during the test.
Figure 9C:
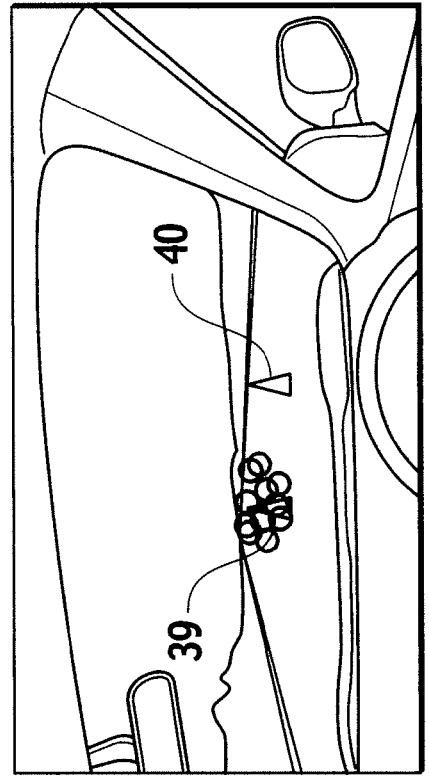
Figure 9A:
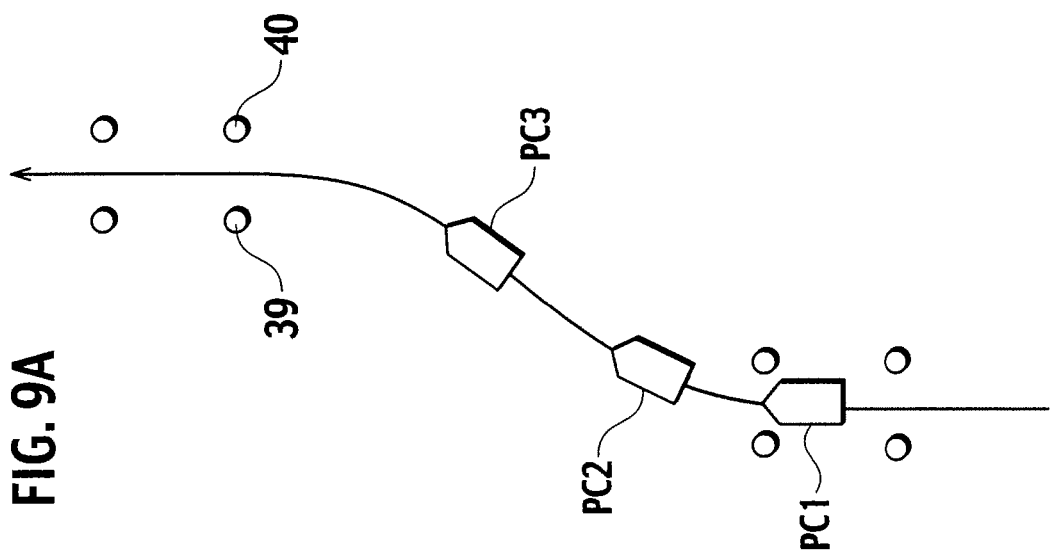
FIG. 9A shows a lane change condition at the time when a driving test on lane change is performed by use of a four-wheel drive vehicle in which the steering of the rear wheels can be switched on/off arbitrarily.

FIG. 9A shows a lane change condition at the time when a driving test on lane change was carried out by use of a four-wheel drive vehicle in which the steering of the rear wheels can be switched on/off arbitrarily. FIG. 9B shows a result of observing the behaviors of the fixation points of a driver at the time when performing four wheel steering. FIG. 9C shows a result of observing the behaviors of the fixation points of a driver at the time when performing two wheel steering.

As shown in FIG. 9A, a lane change by a vehicle is performed, where the vehicle passes from pylons 39 to 40 from a vehicle position PC1 to a vehicle position PC3 through a vehicle position PC2. On this condition of lane change, a driver starts a steering operation to change a lane from the vehicle position PC1 to the vehicle position PC2. At this time, the driver leans his/her upper body toward the inner side of a steering direction. Concurrently, the driver changes his/her posture by turning his/her upper body so that the driver looks straight at the inner side of the steering direction, in order to move his/her fixation point from an infinite distance to a vicinity of a clipping point of a corner. Generally, in such a driving scene, people often feel that a normal vehicle, in which only the front wheels thereof are driven, has maneuverability. The main reason thereof is that the lateral G and the yaw rate occur in substantially the same phase in the beginning of steering, and that a driver thus feels that the direction of a vehicle has changed quickly.

Furthermore, after starting a lane change on this condition, the behaviors of fixation points recorded by use of, for example, an eye mark recorder were examined as the behaviors of the driver at the time when the vehicle reaches the vehicle position PC3. The fixation points were focused on the pylon 39 as shown in FIG. 9C in a case of the four wheel steering. However, a phenomenon where the fixation points scattered as shown in FIG. 9B depending on the speed condition of a lane change, was observed in a case of two wheel steering of the front wheels alone.

At this time, a subjective comment given by a test subject as to where the test subject looked at when driving, is that he/she looked at the pylon 39. However, in reality, when data is analyzed on a case where the test subject drove a vehicle, while wearing an eye mark recorder which analyzes fixation points, the fixation points were scattered regardless of driver's consciousness. This gives the driver a perception that the vehicle does not move as he/she desires. As a result, the driver thinks that he/she is in a state where his/her upper body is unstable. The inventors have confirmed by a test that, in a case where such a phenomenon occurs, a phenomenon where the posture of an upper body (especially a position of the head relative to a vehicle body) and the reproducibility of a steering operation is low.

Figure 10:
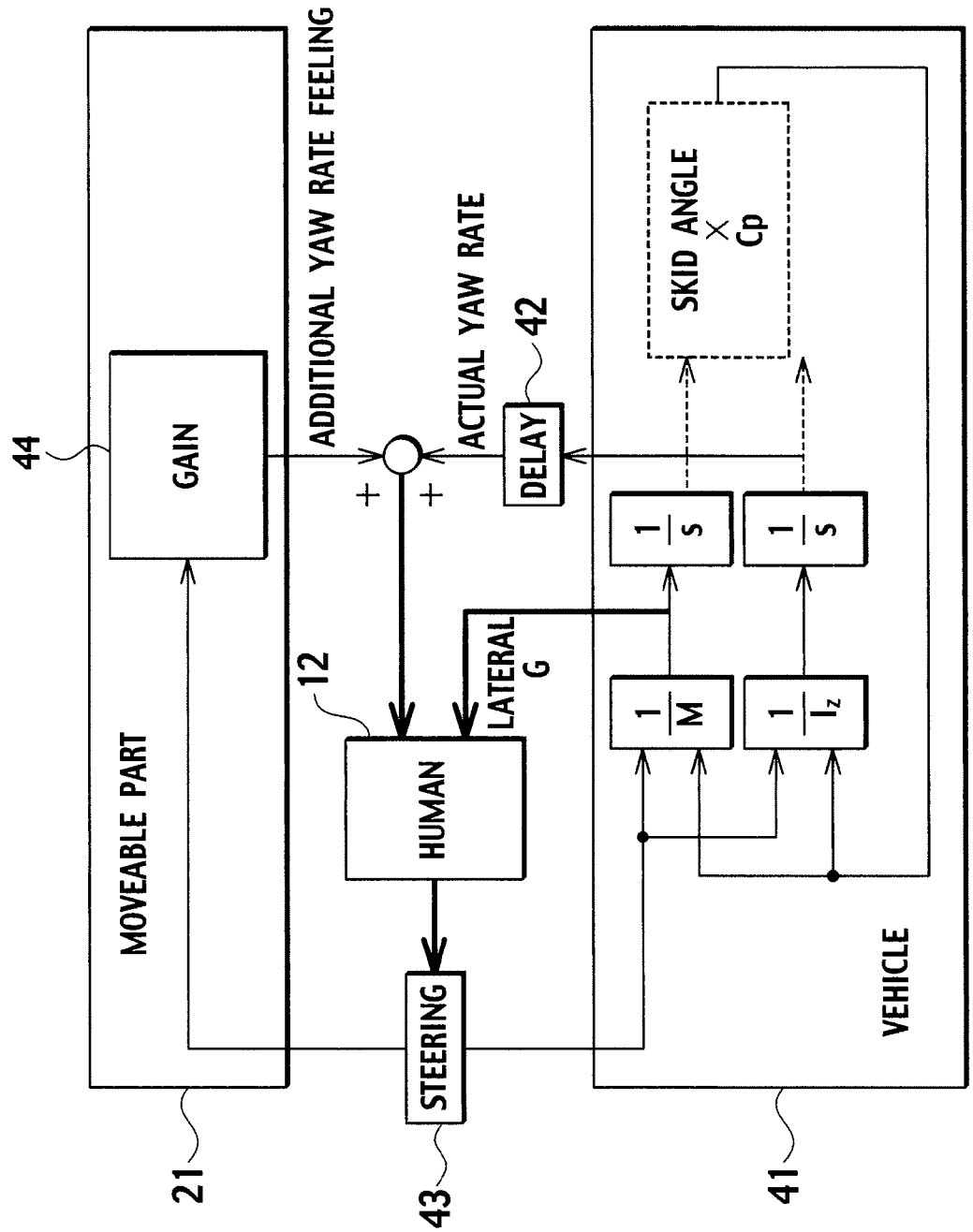
FIG. 10 is a simple block diagram showing an outline of the first embodiment of the present invention.

In contrast, as shown in FIG. 10, the movements of the vehicle can be expressed with a motion equation in which characteristics, such as a cornering power Cp of a tire, a mass M of a vehicle, and the moment of inertia Izr are respectively set as variables. A part for showing this concept in the form of a block diagram corresponds to a part indicated as a vehicle in the bottom part of FIG. 10. However, only the outline is described here, and the detailed handling of the middle part of the block diagram and of the cornering power of a tire are omitted.

For example, vehicle shows characteristics such as under-steer and over-steer, depending on specifications of a vehicle including a difference in an equivalent cornering power of the front and rear tires. Depending on these characteristics, a delay 42 of yaw rate to the lateral G may be caused when a steering operation is performed. This is simply shown as "delay 42" in FIG. 10. When a person provides a steering operation to a vehicle having such characteristics, a yaw rate for lateral G is conveyed to a person with delay. In FIG. 10, this yaw rate of a vehicle is indicated as an "actual yaw rate."

In contrast, a part corresponding to the driver's feeling control apparatus according to the first embodiment of the present invention is a seat driving unit 21 shown in the top part of FIG. 10. It is possible to provide the driver with a yaw rate feeling without delay, by driving, in a yaw rate direction, a seat which has inertia for steering, smaller than that of the vehicle, that is, a seat with a small time constant and high responsibility. In FIG. 10, this is indicated as an "additional yaw rate feeling". The yaw rate felt by the driver 12 is the sum of an "actual yaw rate" and the "additional yaw rate feeling." The seat driving unit 21 adds the "additional yaw rate feeling" to the "actual yaw rate" of the vehicle. For this reason, it is possible to compensate the phase difference characteristic of yaw rate and lateral G which a vehicle originally has, and to make the driver feel, with his/her senses, that yaw rate and the lateral G occur substantially simultaneously with steering.

<Effect>

As described above, the driver's feeling control apparatus of the first embodiment of the present invention includes the steering detection unit 26, the seat 1 and the control unit 25. The steering detection unit 26 detects the amount of a steering operation performed by the driver 12. The seat 1 is in which the driver 12 sits, and which has the movable part 21 displaceable in a perpendicular direction to the longitudinal direction of a vehicle, or a yaw direction; and the control unit 25 determines the displacement amount ($\alpha$, d) of the movable part 21 on the basis of a steering operation amount $\phi$. With this driver's feeling control apparatus, it is made possible to provide the driver with a yaw rate feeling to which the consciousness of the driver 12 is reflected, since the movable part 21 of the seat 1 is displaced in response to the steering operation of the driver 12.

In response to the steering operation of the driver 12, the movable part 21 is displaced in the same direction (the same direction as the turning direction of a vehicle) as a direction of yaw rate and of centripetal acceleration which occur in the vehicle. Thereby, it is possible to provide the driver with a yaw rate feeling without delay at the time of a turn.

The driver's feeling control apparatus further includes the driving unit 3 which drives the movable part 21. The control unit 25 transmits, to the driving unit 3, a command for driving the movable part 21 in accordance with the gain map 33 which determines the displacement amount of the movable part 21 with respect to a steering operation amount. Since the gain of the displacement of the seat 1 with respect to a steering operation is given in a map form, it is possible, for example, to always present, to the driver 12, the appropriate displacement of the seat 1 for a change in driving condition, and to provide the driver with an appropriate yaw rate feeling.

The driver's feeling control apparatus still further includes the vehicle speed detection unit 27 which detects the speed of a vehicle. The control unit 25 switches the gain maps 33 in response to speed. Even in a case where the speed changes from low to high, and where the motion characteristic of a vehicle changes, it is possible to always provide the driver with an appropriate yaw rate feeling by causing a gain to change in response to vehicle speed.

The inventors have confirmed with a test that the optimum value of the gain of the displacement of the seat 1 with respect to steering tends to increase as vehicle speed increases. For this reason, in a case where a steering operation amount is fixed, the control unit 25 switches the gain maps 33 in order to increase the displacement amount of the movable part 21 as speed increases. Thereby, it is made possible to realize this characteristic.

The gain map 33 has a linear characteristic when vehicle speed is less than a predetermined speed threshold value. Meanwhile, the gain map 33 has a non-linear characteristic when vehicle speed is at a speed threshold value or more. In other words, when vehicle speed exceeds a predetermined threshold value, the gain of the displacement of the seat 1 with respect to steering is considered to have a non-linear characteristic. Thus, it is possible to largely displace the seat 1 in the beginning of steering, for example. For this reason, it is made possible to provide the driver with an appropriate yaw rate feeling even if the maximum value of a gain is not set large, and even if the mechanically movable range of the seat 1 is not set large.

When the steering angle φ as a steering operation amount is within ±90°, a yaw rotation angle α as the displacement amount of the movable part 21 is set at 0<α≤θ where θ is an angle that a line extending in the longitudinal direction of a vehicle forms with a straight line connecting the eye point of the driver to a point to be the topmost point of the steering wheel when the vehicle moves straight forward. Thereby, the displacement of the seat 1 follows after lateral or angular displacement which occurs to a driver's upper body, the displacement being caused by a motion made by the driver 12 who tries to look at the inner side of a corner by turning his/her upper-body at the time of a turn. Thus, it is possible to provide the driver 12 with an appropriate yaw rate feeling, and to offer a vehicle in which the driver can feel comfortable.

A yaw rotation angle α is set at 0<α≤θ when the steering angle is within a range of ±90°. However, when the steering angle exceeds ±90°, the yaw rotation angle α is set to be saturated, or to be at 0<α≤θ to the change characteristic of a virtual angle θ which is extrapolated in a manner that the virtual angle θ is continuous with the angle θ for a steering angle within ±90°. In other words, the seat 1 is displaced by saturating the displacement of the seat 1, or by extrapolating a characteristic which is continuous with the displacement characteristic of the seat 1 within ±90°. For this reason, it is possible to offer a vehicle in which the driver can feel comfortable even when steering by ±90° or more.

The pair of right and left side supports 2a and 2b placed respectively on both sides of the seat back 11 are chosen as movable parts. The side supports 2a and 2b are displaced in a yaw direction or in the lateral direction of the vehicle relative to other parts of the seat 1. Since the displacement of the side supports 2a and 2b of the seat 1 is controlled by making this part movable, it is possible to expect an improvement in a driving feeling with a dramatically simple and low-cost system, as compared with an apparatus which improves a phase relationship between lateral G and yaw rate by a four wheel steering system, for example.

At least a part of the seat back 11 is chosen as a movable part, and at least a part of the seat back 11 is displaced in a yaw direction or the lateral direction of a vehicle with respect to the other parts of the seat 1. At least a part of the seat back 11 is made movable, and thus the displacement of this part is controlled. Accordingly, it is possible to expect an improvement in a driving feeling with a dramatically simple and low-cost system, as compared with an apparatus which improves a phase relationship between lateral G and yaw rate by a four wheel steering system, for example.

The entire seat 1 is chosen as a movable part, and the entire seat 1 is displaced in a yaw direction with respect to the vehicle body. The entire seat 1 is made movable, and thus the displacement of this part is controlled. Accordingly, it is possible to expect an improvement in a driving feeling with a dramatically simple and low-cost system, as compared with an apparatus which improves a phase relationship between the lateral G and the yaw rate by the four wheel steering system, for example.

Second Embodiment

In a second embodiment, descriptions will be given of cases where: a displacement amount, a displacement speed or a timing of starting displacement is caused to vary between a side support on the inner side of a turn and a side support placed on the outer side of a turn; and a displacement shaft of a side support for a seat back 11 is caused to lean.

An entire configuration of a driver's feeling control apparatus according to the second embodiment is the same as the configuration in FIG. 1, and illustrations and descriptions thereof will be omitted.

Figure 11:
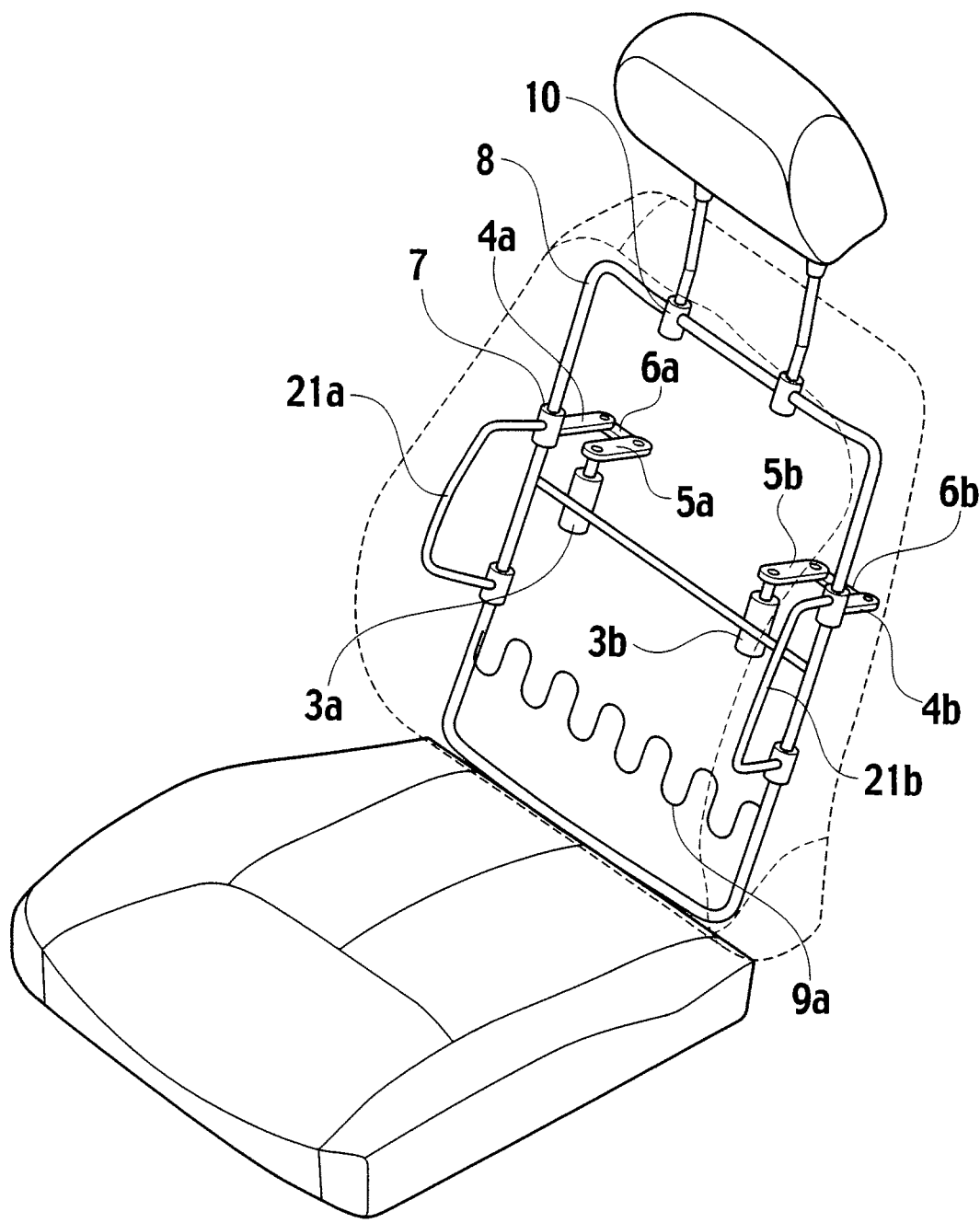
FIG. 11 is a perspective view showing a specific internal structure of a seat.

FIG. 11 shows a specific internal structure of a seat 1. Descriptions will be given of points different from those of FIG. 2B, and descriptions for the same parts will be omitted. The seat 1 includes two motors 3a and 3b. A side support 21a is connected to the motor 3a via first to third links 4a to 6a. A side support 21b is connected to the motor 3b via a first to third links 4b to 6b. In other words, the pair of right and left side supports 21a and 21b are driven respectively by the different motors 3a and 3b. The rotation angle of the motor 3a is conveyed as the oscillatory motion of the side support frame 21a, and the rotation angle of the motor 3b is conveyed as the oscillatory motion of the side support frame 21b.

Figure 12B:
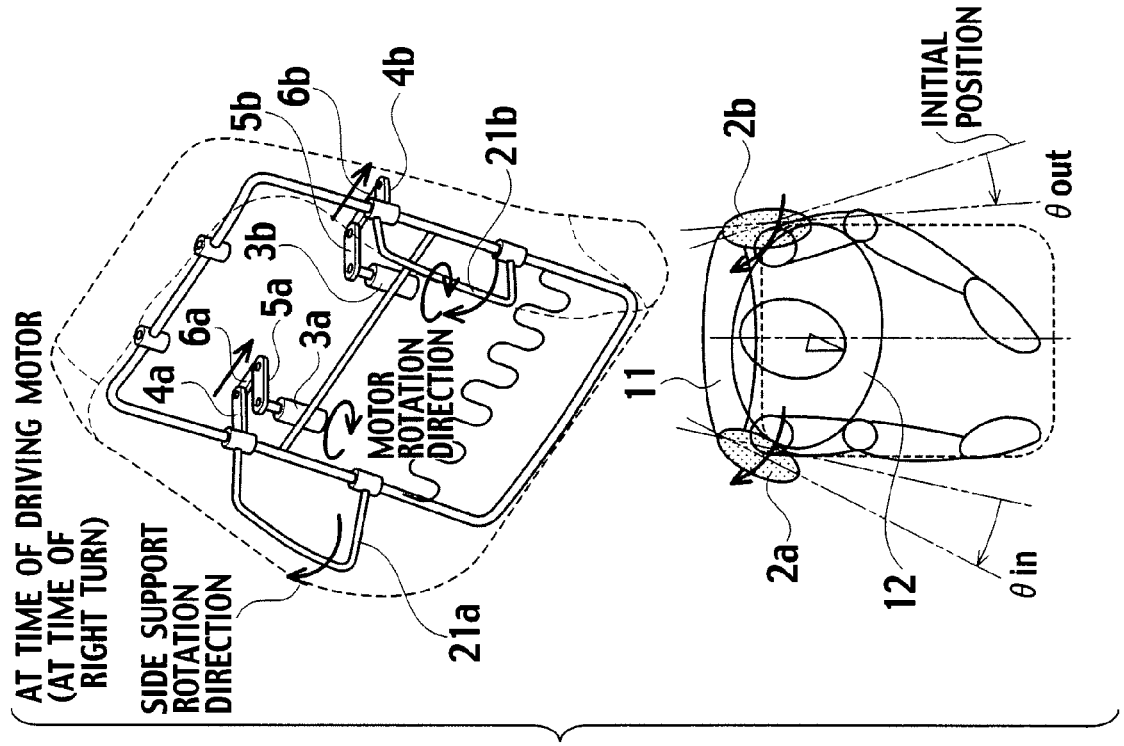
FIGS. 12A and 12B are each perspective and top views showing a relationship between the displacement of the side support of FIG. 11 and a steering operation performed by a driver.
Figure 12A:
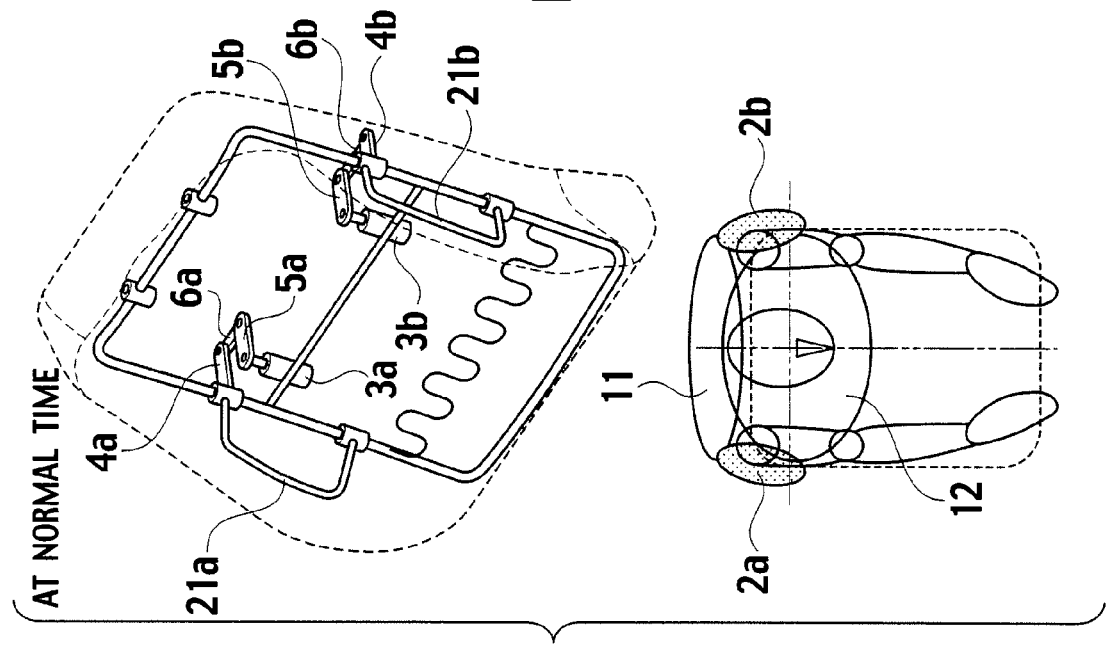

As shown in FIG. 12A, the right and left side support frames 21a and 21b (side supports 2a and 2b) are held at bilaterally symmetrical positions to an axis in the longitudinal direction of a vehicle when a vehicle is not making a turn, that is, when a driver is not conducting a steering operation of the steering wheel (at a normal time) The motors 3a and 3b are not performing a rotational action, and thus the first to third links 4a to 6a and 4b to 6b do not move.

On the other hand, as shown in FIG. 12B, when a vehicle is making a right turn, that is, when a driver is conducting a steering operation of the steering wheel for a right turn (at a time of turning right), the motors 3a and 3b are caused to rotate by a certain angle in a direction shown in FIG. 12B. This rotation of the motors 3a and 3b is conveyed to the right and left side support frames 21a and 21b respectively via the first to third links 4a to 6a and 4b to 6b. Then, the side support frame 21a (the side support 2a) rotates by a rotation angle θin in the same direction as a yaw direction of the vehicle at the time of turning right, the rotation starting from a position of FIG. 12A (an initial position). On the other hand, the side support frame 21b (the side support 2b) rotates by a rotation angle θout in the same direction as a yaw direction of the vehicle at the time of turning right, the rotation starting from a position of FIG. 12A (the initial position). In this manner, in the second embodiment, the rotation angles of the right and left side support frames 21a and 21b differ from each other. Furthermore, the displacement amount (a rotation angle θin) of the side support 2a located on the inner side of a turn is set to be greater than that (a rotation angle θout) of the side support 2b located on the outer side of a turn.

Incidentally, in this event, descriptions have been given by taking an example of the displacement amounts (the rotation angles) of the side supports (the side support frames). Meanwhile, displacement speeds of the right and left side supports (the side support frames) may be made different from each other, instead of making the displacement amounts different from each other.

FIG. 13A is a view which specifically shows the entire configuration of the driver's feeling control apparatus according to the second embodiment, and which especially shows the configuration of a control unit 25 in detail. The control unit 25 (a control unit) includes a steering encoder reading unit 31, a speed pulse reading unit 32, a right-side gain map 33a, a left-side gain map 33a, a right-side motor drive circuit 34a, and a left-side motor drive circuit 34b. The steering encoder reading unit 31 reads the amount of steering operation detected by a steering encoder 26 (a steering detection unit). The speed pulse reading unit 32 reads the speed of a vehicle detected by a wheel speed sensor 27 (a vehicle speed detection unit). The right-side gain map 33a drives a motor 3a on the right side. The left-side gain map 33b drives a motor 3b on the left side. The right-side motor drive circuit 34a transmits a drive command value which causes the motor 3a to rotate. The left-side motor drive circuit 34b transmits a drive command value which causes the motor 3b to rotate.

Signals from the steering encoder 26 are counted and converted to a read steering angle ϕ. Thereafter, the steering angle ϕ is multiplied by right- and left-side gains to obtain each of the rotation angle command values of the motors 3a and 3b. Moreover, the right and left rotation angle command values are input to the right- and left-side motor drive circuits 34a and 34b, and different drive voltage/current is then applied to each of the motors 3a and 3b.

As shown in FIG. 13B, the control unit 25 includes the gain map 33 which are mutually different, depending on speed, for example, at the time when vehicle speed is low (approximately at 30 km/h) or medium (approximately at 50 km/h). Incidentally, the gain characteristic of the left-side side support frame 21b is shown here. Gains differ depending on whether the value of the steering angle α is positive or negative. This is because positions of the inside and outside of a turn are switched to each other depending on a steering direction. The control unit 25 determines a rotation angle command value of the motor 3 corresponding to the steering angle ϕ by use of the right and left gain maps 33a and 33b.

A steering angle ϕ of the steering wheel is set to be formed in a positive direction at the time of turning right. A direction, in which side support angular displacement α is formed, is set to be positive at the time of turning toward a clockwise direction from an initial point, the direction being viewed from above the seat. When the positive and negative directions of each angle are determined as described above, the first quadrant of the left-side gain map 33b for the left-side side support frame 21b is the side support frame on the outer side of a turn, and the third quadrant thereof is the side support frame on the inner side of a turn.

At this time, a map inclination β of the first quadrant is set smaller than a map inclination γ of the third quadrant, since an outside side support rotation angular displacement θout is smaller than an inside side support rotation angle θin. It has been confirmed, with a test carried out by the inventors, that an optimal relationship between β and γ is represented by γ≈1.2β.

In the gain map 33, a gain basically has a linear characteristic when the vehicle moves at a low speed of approximately 50 km/h or lower as a reference, and a gain is set to increase as vehicle speed increases. In addition, the angular displacement θ of the side support frame is caused to have a characteristic to be saturated at the time when a steering angle reaches 90°.

Here, shown has been the left-side gain map 33b for driving the left-side side support frame 21b. However, it is possible to use the same map as the example of the map shown in FIG. 13B, by setting an anticlockwise direction viewed from above a seat, to be positive for the rotation direction of the side support frame.

Modification Example

Timings of starting the displacement of the right and left side support frames may be different from each other for the driver's feeling control apparatus in FIG. 13A. For example, as shown in FIG. 14A, the driver's feeling control apparatus further includes a first-order delay filters 52a and 52b in the latter part of the right and left gain maps 33a and 33b. Signals passed through the first-order delay filters 52a and 52b receive feedback of a current motor rotation angle. Moreover, the driver's feeling control apparatus includes a block (a steering direction determination unit 51) which determines a turning direction of the steering wheel. The right and left gain maps 33a and 33b have a gain characteristic to be symmetrical (β=γ) with respect to a point of origin as shown in FIG. 14B.

The steering direction determination unit 51 determines a steering direction, and then transmits its result to the first-order delay filters 52a and 52b. The first-order delay filter for the motor drive circuit of the side support frame at the side of the outward direction of a turn, is selectively made operative. In other words, a timing at which the side support on the inner side of a turn starts to be displaced, is caused to occur earlier than a timing at which the side support on the outer side of a turn starts to be displaced. For this reason, it is possible to eventually obtain a relationship of θout<θin in the beginning of a turn, as already described. In other words, even when a simple symmetrical-type gain map as shown in FIG. 14B is used, it is possible to obtain a relationship of θout<θin by selectively using the right and left first-order delay filters. Accordingly, the capacity of a seat control program can be reduced.

The first-order delay filters 52a and 52b are used in the modification example. Meanwhile, substantially the same effect can be obtained even when a dead time filter or a second-order delay filter is used instead of the first-order lag filters 52a and 52b. In other words, any type of filter will suffice as long as the filter is that in which side support displacement in the outward direction of a turn has a phase which is delayed as compared to that of side support displacement in the inward direction of a turn.

Figure 15A:
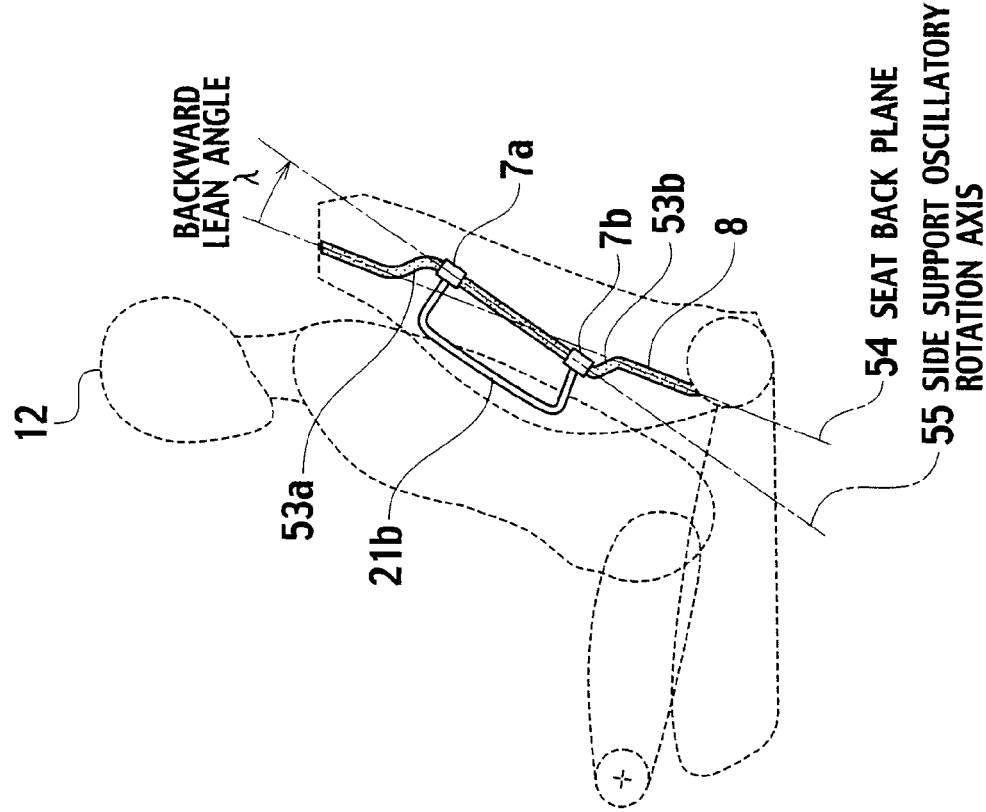
FIG. 15A is a perspective view showing an internal configuration of a seat according to another modification example.
Figure 15B:
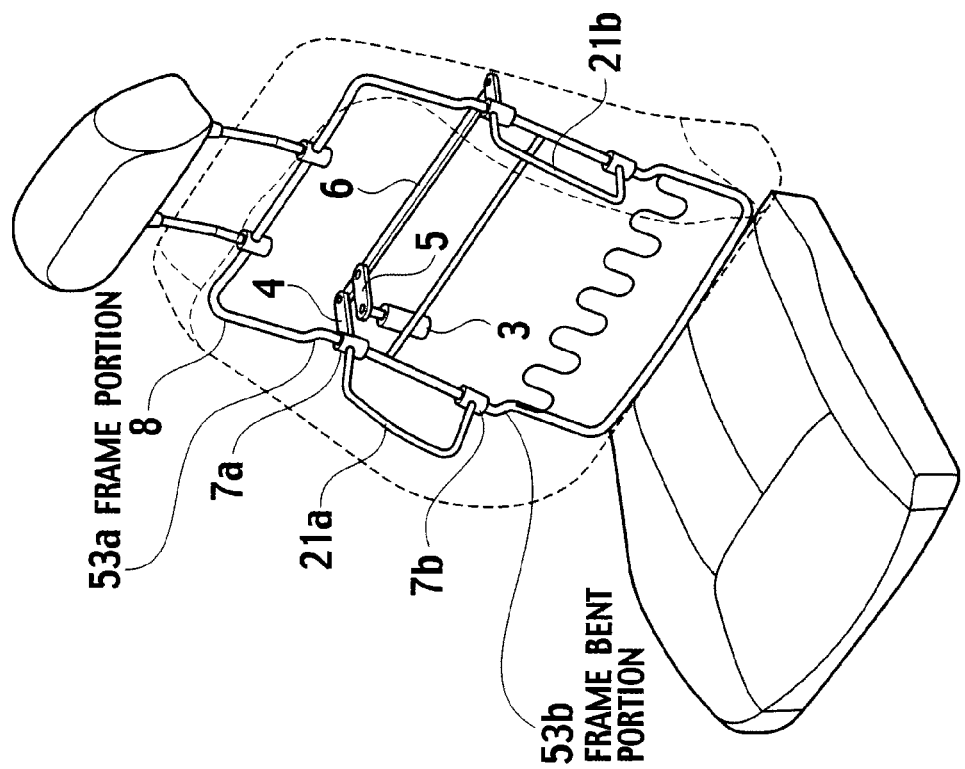
FIG. 15B shows a cross-sectional view thereof.

Incidentally, frame bent portions 53a and 53b may be provided to the two parts, which are upper and lower parts, of a seat back frame 8 as shown in FIG. 15A. As shown in FIG. 15B, an oscillatory rotation axis 55 of the side support frames 21a and 21b is caused to have a backward lean angle λ against a seat back plane 54. In other words, an axis 55 of the displacement of the side support frames 21a and 21b leans toward the rear of the vehicle as compared with a torso angle 54 of a seat 1. Note that, in this event, the right and left side support frames 21a and 21b are coupled with each other by first to third links 4 to 6, and that the side support frames 21a and 21b are driven by one motor 3. However, the present invention is not limited to this configuration. As shown in FIG. 11, different motors may be used for the right and left side support frames 21a and 21b, respectively.

As shown in FIG. 16A, the control unit 25 which drives a seat in FIG. 15A is identical to that in FIG. 4A. The longitudinal axis is indicated as a side support rotation angle in the gain map in FIG. 16B. However, it is difficult to define a side support rotation angle because the oscillation axis of the side support frames 21a and 21b leans in a three dimensional manner. For this reason, a side support rotation angle may be replaced with a motor rotation angle. Note that the gain map 33 in FIG. 16B has a symmetrical characteristic with respect to a point of origin. In other words, the right and left side supports 2a and 2b are displaced substantially by the same amount in the same direction as those of each other in response to a steering operation.

In this event, attention is turned to a change in the posture of the upper body of a driver 12, as he/she performs a steering operation. As can be seen from the top view of FIG. 17A, the driver 12 moves to turn his/her upper body at the time of turning a vehicle. In the first and second embodiments, the side supports 2a and 2b follow this turn of the upper body. Meanwhile, the driver 12 concurrently moves to fold his/her upper body toward the inward direction of a turn as in FIG. 17B. This motion of folding the upper body is performed centering the waist. As a result, the displacement in a lateral direction of the upper-body becomes larger as it goes from the waist to the shoulder of the driver.

Figure 17B:
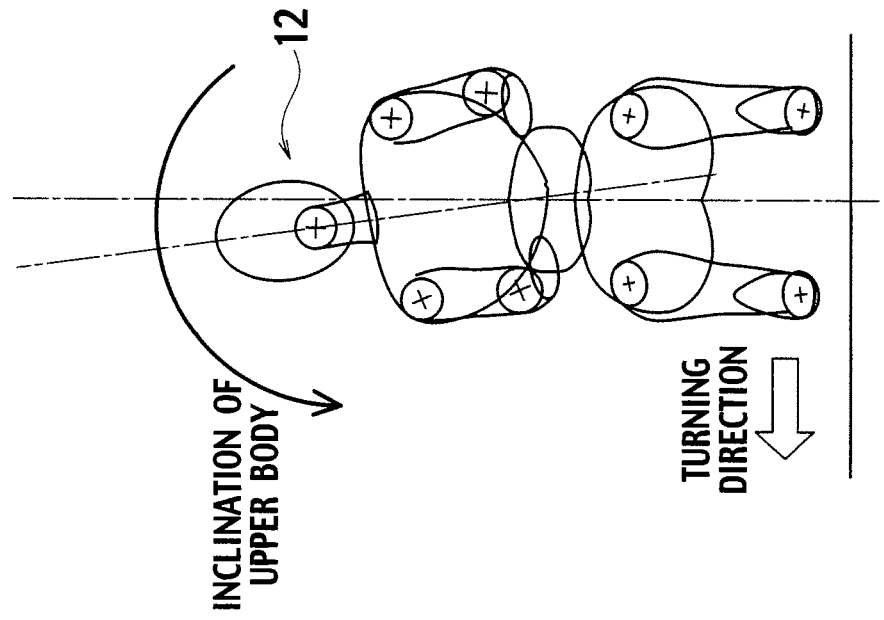
FIG. 17B is a front view showing a motion of the upper body of the driver at the time of turning the vehicle.
Figure 17A:
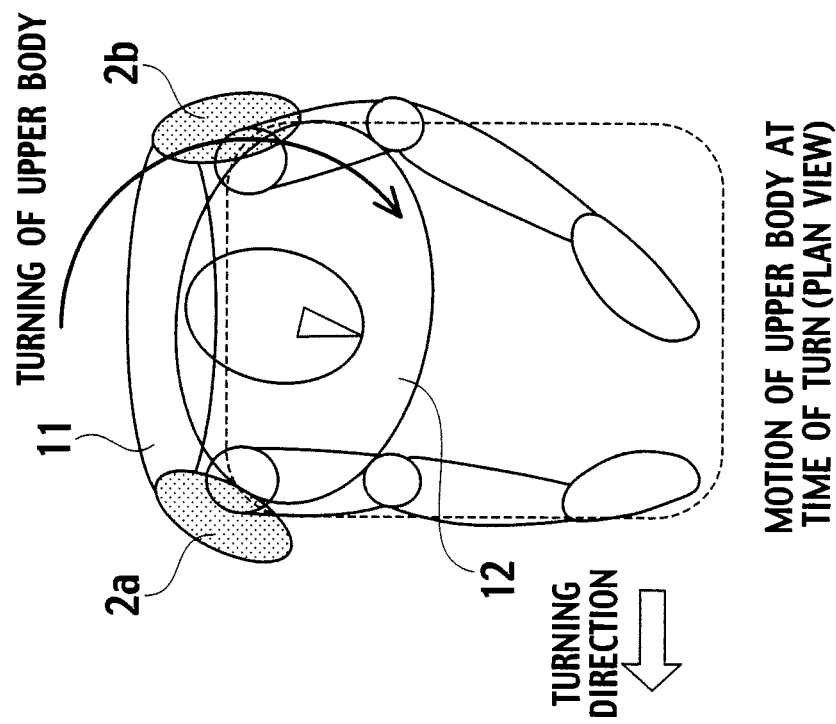
FIG. 17A is a top view showing a motion of an upper body of a driver at the time of turning a vehicle.

Accordingly, in a case where the seat back plane 54 and the side support oscillation axis 55 in FIG. 15B are parallel to each other, it is not possible to cause the side supports 2a and 2b to follow the motion of folding the upper body as shown in FIG. 17B even though it is possible to cause the side supports 2a and 2b to follow the motion of folding the upper body as shown in FIG. 17A. As a result, the following phenomenon may occur. Specifically, the side supports 2a and 2b on the inside of a turning direction hit the upper body strongly in a region near the shoulder.

For this reason, as shown in FIGS. 15A and 15B, the side support oscillation axis 55 is caused to lean backward from the seat back plane 54. Thereby, it is made possible to obtain a characteristic that the displacement in a lateral direction is larger toward the upper portions of the side supports 2a and 2b when the side support frames 21a and 21b are caused to be rotated and displaced toward the outside of the seat.

Figure 18A:
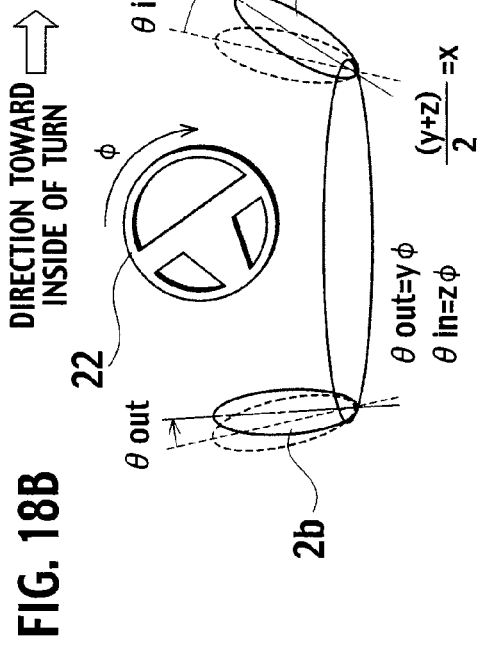
FIG. 18A is a top view schematically showing a case (θout=θin) where side supports are displaced in a yaw direction in response to a steering operation by a driver.
Figure 18B:
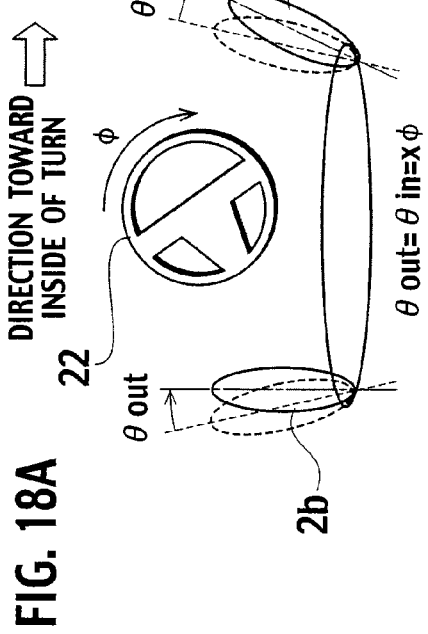
FIG. 18B is a top view schematically showing another case (θout<θin) where the side supports are displaced in a yaw direction in response to a steering operation by the driver.
Figure 18C:
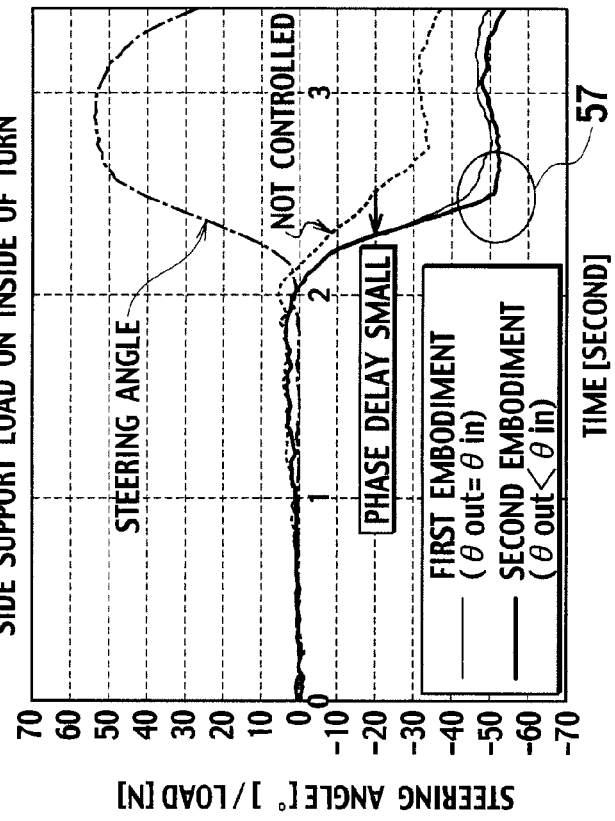
FIG. 18C is a graph showing temporal changes in loads of a side support on the inner side of a turn.

In other words, in a case where the right and left side support frames 21a and 21b are driven, the side support 2a corresponding to the inward direction of a turn has a characteristic that lateral displacement becomes larger toward the upper portion of the side support 2a. Accordingly, even when the upper body is folded concurrently with the turning of the upper body, the phenomenon where the side support 2a strongly hits a region near the shoulder of an occupant does not occur. Hence, the loads of the side supports 2a and 2b as described later in FIGS. 18A, 18B and 18C is kept reduced. For this reason, even when the right and left side support frames 21a and 21b are driven by the single motor 3, the effect of improving a driving feeling as already described can be obtained. Thus, it is possible to keep system costs low.

Test Example

A driving test on lane change shown in FIGS. 9A to 9C was carried out by use of a vehicle on which the driver's feeling control apparatus according to the second embodiment was mounted. At this time, the vehicle was in a state of two wheel steering with the rear wheel steering being off. As a result of the test, it is confirmed that, even when the rear wheel steering was off, distribution close to fixation point distribution shown in FIG. 9C was obtained. The vehicle with four wheel steering used in the test was in a state where yaw rate occurred later than lateral G while the rear wheel steering was off. However, an additional yaw rate feeling was added by driving a seat so that the two wheel steering was perceived, by the driver, to be the same as the four wheel steering even when the rear wheel steering was off. In the same event, when a plurality of test subjects were asked for their subjective evaluations, such comments that they could drive comfortably, which show the effect where a driving feeling was improved, were obtained.

FIG. 18A schematically shows a case where the side supports 2a and 2b of the seat were displaced in a yaw direction in response to the steering operation by the driver. Suppose that the right and left side supports 2a and 2b are together displaced toward the inside of a turn with an appropriate gain for a steering wheel 22. In this event, a driving feeling that yaw rate is synchronized with lateral G can be obtained as described above. This appropriate gain can be determined experimentally, and a value of the appropriate gain is substantially the identical fixed value regardless of variations among individuals. Here, this appropriate gain (a steering angle φ/side support oscillation angle θ) is supposed to be x. In the first embodiment, a side support oscillation angle θout on the outer side of a turn is equal to a side support oscillation angle θin on the inner side of a turn. In other words, the side support oscillation angles θout and θin have a relationship of θout=θin=xφ with respect to a steering angle φ.

As shown in FIG. 18B, the effect of improving a driving feeling is further increased by causing a method of driving the side supports to exert a relationship of θout<θin. In the event of a test thereof, a side support drive gain on the outer side of a turn is set to be y, and a side support drive gain on the inner side of a turn is set to be z. Then, a relationship of y and z is set to be (y±z)/2=x, and y<z. In other words, the total stroke amounts of the right and left side supports are the same as those of FIG. 18A, while being in a state where the driving amounts of the right and left side supports corresponding to a steering angle φ are mutually different. Compared with a case of driving both of the right and left side supports with the gain x, the subjective evaluations of the test subjects of this test obviously improved.

This phenomenon was observed in more detail while focusing on the load values of the right and left side supports. Measured were the loads of the right and left side supports of the time when the vehicle moved at 50 km/h on a lane change course similar to that shown in FIG. 9A. FIG. 18C shows a load measurement result from a state of driving straight to a vehicle position PC3 through a vehicle position PC1. Here, shown is a load added on the side support 2a at the side of the inward direction of a turn. What are shown on the longitudinal axis in FIG. 18C are the side support loads and a steering angle ϕ where a state of driving straight is set to be 0, and the unit thereof is [°] or [N].

In a case where the turning operation for the steering wheel is performed from the state of driving straight to the vicinity of the vehicle position PC1 (in the vicinity of time 2.0 s), the side support loads on both of the inside and outside of a turn are reduced in close synchronization with the steering angle ϕ. Suppose a case of driving both of the right and left side supports with a relationship of θout=θin=αϕ corresponding to a steering angle ϕ, as in the first embodiment. In this case, the phase delay of the load reduction of the side supports for a steering angle ϕ is reduced as compared with a case where control is not performed. Meanwhile, the amount of load reduction of the side supports concurrently increases. Moreover, in a case of driving the side supports with a relationship of θout=yϕ<θin=zϕ as in the second embodiment, as compared with a case of employing a relationship of θout=θin=xϕ, a phase of the road reduction of the side supports corresponding to a steering angle ϕ does not change, and the amount of the load reduction of the side supports increases (a part 57).

From a result of the subjective evaluations by the test subjects and a reaction to a result of the side support load change measurement, two points of the phase delay and the amount of load reduction of the side supports corresponding to a steering angle in the beginning of steering are considered to be largely related to an increase in a yaw rate feeling. In the second embodiment, the total displacement amount of the side supports is kept the same as the first embodiment, while the right and left displacement amounts are made mutually different. For this reason, it is possible to increase the load reduction amount of the side support in the beginning of steering by approximately 20%. Accordingly, the effect of improving the subjective evaluations is considered to be obtained.

<Effect>

As described above, in the second embodiment of the present invention, the control unit 25 sets the displacement amount θin or moving speed of the side support, which are positioned on the inner side of a turn, to be greater than the displacement amount θout or moving speed of the side support which are positioned on the outer side of a turn. In other words, as compared with the first embodiment, it is made possible to further improve a yaw rate feeling, and to give a driver a comfortable driving feeling, since a relationship of θout<θin is given in the second embodiment.

The control unit 25 sets a timing of starting the displacement of the side support on the inner side of a turn to occur earlier than a timing of starting the displacement of the side support on the outer side of a turn. In other words, it is possible to provide a relationship of θout<θin in the beginning of a turn without depending on the drive gains of the right and left side supports, by setting a motion of the side support on the inner side of a turn to start earlier than a motion of the side support on the outer side a turn.

The axis (a side support oscillation axis 55) of the displacement of the side support leans further toward the rear of a vehicle than a torso angle (a seat back plane 54) of the seat 1. The oscillation axis 55 of the side support leans backward with respect to the seat back plane 54. Accordingly, it is possible to achieve the above effect with a mechanical structure only by causing the upper parts of the side supports 2a and 2b to be largely displaced in a lateral direction of the seat 1 when the side supports 2a and 2b on the inner side of a turn swing.

As described above, the present invention has been described with two embodiments. However, it should not be understood that the statements and the drawings, which are parts of this disclosure, limit the present invention. Various alternative embodiments, examples and operational techniques are obvious to those skilled in the art from this disclosure. That is, it should be understood that the present invention includes various embodiments and the like, which are not described herein. Hence, the present invention is limited only by invention features related to an appropriate scope of claim from this disclosure.

What is claimed is:

1. A driver's feeling control apparatus for providing an additional yaw rate feeling to a driver driving a vehicle, comprising:
   a steering detection unit configured to detect an amount of steering wheel rotation;
   a driver's seat configured to support a vehicle occupant and having a pair of right and left side supports respectively placed on both sides of a seat back of the driver's seat, the right and left side supports being rotatable about an axis substantially parallel to a yaw axis of the vehicle, the right and left side supports being configured to rotate in a same direction as a yaw direction of the vehicle with rotation amounts that differ from each other, relative to other parts of the seat back of the driver's seat; and
   a control unit configured to determine the rotation amount of each of the right and left side supports based on the amount of steering wheel rotation,
   wherein, when a steering angle as the amount of steering wheel rotation is within ±90°, a respective yaw rotation angle α as the amount of rotation of each of the right and left side supports in the yaw direction of the vehicle is controlled by the control unit, to satisfy 0<α≤θ where θ is an angle that a longitudinal direction of the vehicle forms with a straight line connecting an eye point of the driver to a point to be a topmost point of the steering wheel when the vehicle moves straight forward, and
   wherein, when the steering angle exceeds ±90°, the respective yaw rotation angle α is set to be saturated, or to be 0<α≤θ where θ for the steering angle exceeding ±90° is a virtual angle extrapolated in a manner that the virtual angle θ for the steering angle exceeding ±90° is continuous with the angle θ for the steering angle within ±90°.

2. A driver's feeling control apparatus for providing an additional yaw rate feeling to a driver driving a vehicle, comprising:
   a steering detection unit configured to detect an amount of steering wheel rotation;
   a driver's seat configured to support a vehicle occupant and having a movable part rotatable about an axis substantially parallel to a yaw axis of the vehicle, wherein the movable part rotates in a same direction as a yaw direction of the vehicle; and
   a control unit configured to determine an amount of rotation of the movable part based on the amount of steering wheel rotation,
   wherein, when a steering angle as the amount of steering wheel rotation is within ±90°, a respective yaw rotation angle α as the amount of rotation of the movable part is set to be 0<α≤θ where θ for the steering angle within ±90° is an angle that a longitudinal direction of the vehicle forms with a straight line connecting an eye point of the driver to a point to be a topmost point of the steering wheel when the vehicle moves straight forward, and wherein, when the steering angle exceeds ±90°, the respective yaw rotation angle α is set to be saturated, or to be 0<α≤θ where θ for the steering angle exceeding ±90° is a virtual angle extrapolated in a manner that the virtual angle θ for the steering angle exceeding ±90° is continuous with the angle θ for the steering angle within ±90°.

\* \* \* \* \*